US011622395B2

(12) United States Patent
Xin et al.

(10) Patent No.: US 11,622,395 B2
(45) Date of Patent: *Apr. 4, 2023

(54) METHOD FOR ALLOCATING BEARER IDENTIFIER, APPARATUS, AND SYSTEM

(71) Applicant: Huawei Technologies Co., Ltd., Shenzhen (CN)

(72) Inventors: Yang Xin, Shanghai (CN); Xiaobo Wu, Shenzhen (CN); Weiwei Chong, Shanghai (CN); Runze Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

This patent is subject to a terminal disclaimer.

(21) Appl. No.: 17/226,398

(22) Filed: Apr. 9, 2021

(65) Prior Publication Data
US 2021/0227598 A1    Jul. 22, 2021

Related U.S. Application Data

(63) Continuation of application No. 16/575,585, filed on Sep. 19, 2019, now Pat. No. 10,980,071, which is a (Continued)

(51) Int. Cl.
*H04W 76/11* (2018.01)
*H04W 8/08* (2009.01)
(Continued)

(52) U.S. Cl.
CPC ............ *H04W 76/11* (2018.02); *H04W 8/08* (2013.01); *H04W 28/0268* (2013.01); *H04W 36/08* (2013.01); *H04W 80/10* (2013.01)

(58) Field of Classification Search
CPC ... H04W 76/11; H04W 8/08; H04W 28/0268; H04W 36/08; H04W 80/10
(Continued)

(56) References Cited

U.S. PATENT DOCUMENTS 10,548,046 B2   1/2020  Cho et al.
10,681,607 B2   6/2020  Shah et al.
(Continued)

FOREIGN PATENT DOCUMENTS

CN   101588548 A   11/2009
CN   102986271 A    3/2013
(Continued)

OTHER PUBLICATIONS

113rd Generation Partnership Project; technical Specification Group Services and System Aspects; Procedures for the 5G System; Stage 2; (Release 15), 3GPP Draft; 23.502-020, Feb. 24, 2017, 71 pages.
(Continued)

*Primary Examiner* — Nghi H Ly
(74) *Attorney, Agent, or Firm* — Conley Rose, P.C.

(57) ABSTRACT

A session management method, an access management function device, and a session management device, where the method is carried out by an access and mobility management network element and includes: obtaining first subscription data of a terminal in a first communications network and second subscription data of the terminal in a second communications network, where the first subscription data includes a data network name (DNN), and the second subscription data includes an access point name (APN) corresponding to the DNN; allocating a bearer identifier to a bearer in a packet data network (PDN) connection corresponding to the APN; receiving a flow identifier that is of a flow in a protocol data unit (PDU) session corresponding to the DNN and that is sent by a session management network element; and sending the bearer identifier and the flow identifier to the terminal.

20 Claims, 8 Drawing Sheets

Related U.S. Application Data continuation of application No. PCT/CN2017/077371, filed on Mar. 20, 2017.

(51) Int. Cl.
  *H04W 36/08* (2009.01)
  *H04W 28/02* (2009.01)
  *H04W 80/10* (2009.01)

(58) Field of Classification Search
  USPC .............. 370/329, 328, 338, 341, 345, 350
  See application file for complete search history.

(56) References Cited

U.S. PATENT DOCUMENTS

| | | | |
|---|---|---|---|
| 10,841,933 | B2 | 11/2020 | Hapsari et al. |
| 10,980,071 | B2 * | 4/2021 | Xin .................. H04W 28/0268 |
| 2016/0072930 | A1 | 3/2016 | Shi et al. |
| 2019/0021043 | A1 | 1/2019 | Myungjune et al. |

FOREIGN PATENT DOCUMENTS

| | | |
|---|---|---|
| KR | 20160065168 A | 6/2016 |
| WO | 2016175926 A1 | 11/2016 |
| WO | 2017034352 A1 | 3/2017 |

OTHER PUBLICATIONS

3GPP TS 23.003 V14.3.0; 3rd Generation Partnership Project; technical Specification Group core Network and Terminals; Nubering, addressing and identification; (Release 14), Mar. 2017, 256 pages.

3GPP TS 23.401 V14.3.0, Mar. 2017, 3rd Generation Partnership Project; Technical Specification Group Services and System aspects; General Packet Radio Service (GPRS) enhancements for Evolved Universal Terrestrial Radio access Network (E-UTRAN) access (Release 14), 386 pages.

3GPP TS 23.501 V0.3.0 (Feb. 2017); 3rd Generation Partnership Project; Technical Specification Group Services and System aspects; system architecture for the 5G System; Stage 2 (Release 15); 19 pages.

3GPP TS 23.501 V0.3.1 (Mar. 2017); 3rd Generation Partnership Project; Technical Specification Group Services and System Aspects; System architecture for the 5G System; Stage 2 (Release 15), 97 pages.

3GPP TS 23.502 V0.2.0 (Feb. 2017), 3rd Generation Partnership Project; Technical Specification Group Services and System Aspects; Procedures for the 5G System; Stage 2 (Release 15), 71 pages.

3GPP TS 29.274 V14.3.0; 3rd Generation Partnership Project; Technical Specification Group Core Network and Terminals; 3GPP Evolved Packet System (EPS); Evolved General Packet Radio Service (GPRS) Tunelling Protocol tor Control plane (GTPv2-C); Stage 3; (Release 14) Mar. 2017, 369 pages.

Ericsson, "23.502: 5G-EPC interworking," SA WG2 Meeting #119, S2-170805, Feb. 13-17, 2017, Dubrovnik; Croatia, 6 pages.

Ericsson. Allocation of EPS bearer ID in 5GS, SA WG2 meeting #121, May 15-19, 2017, Hangzhou, China, s2-173322, 8 pages.

Ericsson, Correlation between EBI and QFI, 3GPP TSG-SA WG2 Meeting #127bis, May 28-Jun. 1, S2-18490, 5 pages.

Ericsson; 23.501: 5GC-EPC interworking, SA WG2 meeting #11913, Feb. 17, 2017, Dubrovnik, Croatia, S2-170804; Interworking and Migration, 7 pages.

Huawei, et al., TS 23.501: Description of DNN SA WG2; S2-171064; Meeting #119; Feb. 13-17, 2017, Dubrovnik, Croatia, 3 pages.

Huawei, et al., TS 23.502: Addition of AMF service for EPS Bearer ID Allocation, SA WG2 Meeting #123, Oct. 23-27, 2017, Ljubjana, Slovenia, S2-177561, 5 pages.

Nokia, et al., 23.501 5.9.3: DNN Versus APN; SA WG2; S2-170888; Meeting #119; Feb. 13-17, 2017, Dubrovnik, Croatia; 2 pages.

Nokia; TS 23.502: P-CR for Single Registration-based Interworking from EPS to 5GS procedure; SA WG2 Meeting #119; S2-171013; Feb. 13-17, 2017, Dubrovnik, Croatia, 5 pages.

NTT Docomo "TS 23.502: Nx-Based Handover procedure," 3GPP Draft, S2-171503, Feb. 17, 2017, 4 pages.

NTT Docomo, "Nx-based interworking procedures from QoS point of view," SA WG2 meeting #119, S2-17xxxx, (S2-170936), Feb. 13-17, 2017, Dubrovnik, Croatia, 4pages.

NTT Docomo, et al., "TS 23.502: Nx-based Handover procedure," 3GPP Draft; S2-171590, Feb. 18, 2017, 3 pages.

NTT Docomo, Intel; TS 23.502: Nx-based Handover procedure; S2-171608; SA WG2 Meeting #119, Feb. 2017, Dubrovnik, Croatia, 4 pages.

NTT Docomo: "TS 23.502: Nx-based Handover procedure," 3GPP Draft; S2-170937, Feb. 13, 2017, 8 pages.

Qualcomm Incorporated, UE Capability related to integrity protection of DRBs for signaling of the maximum supported data rate per UE for integrity protection. 3GPP TSG-WG2 Meeting #127, Sanya, China, Apr. 16-20, 2018, S2-184948, 4 pages.

* cited by examiner

METHOD FOR ALLOCATING BEARER IDENTIFIER, APPARATUS, AND SYSTEM

CROSS-REFERENCE TO RELATED APPLICATIONS

This application is a continuation of U.S. patent application Ser. No. 16/575,585, filed on Sep. 19, 2019, which is a continuation of International Patent Application No. PCT/CN2017/077371 filed on Mar. 20, 2017. All of the aforementioned patent applications are hereby incorporated by reference in their entireties.

TECHNICAL FIELD

Embodiments of this disclosure relate to the communications field, and more specifically, to a method for allocating bearer identifier, an apparatus and a system.

BACKGROUND

With appearance of demands for networks such as the Internet of Things and the Internet of Vehicles, there are increasing requirements of users on a next generation mobile communications network, that is, a $5^{th}$ generation (5G) mobile communications network. In the 5G network, to ensure interworking between the 5G network and a $4^{th}$ generation (4G) network or between the 5G network and another network (such as a $2^{nd}$ generation (2G) or $3^{rd}$ generation (3G) network), an interworking procedure similar to that between the 4G network and the 3G network or between the 4G network and the 2G network is used. For example, handover is performed using a solution of mobility management (MM) context mapping or session management (SM) context mapping.

However, the solution in which handover is performed through context mapping has a complex procedure, making it inconvenient to ensure a deployment process of the 5G network.

SUMMARY

Embodiments of this disclosure provide a session management method, to simplify an interworking procedure between different communications networks.

According to a first aspect, a session management method is provided. The method includes: obtaining, by an access and mobility management network element, subscription data of a terminal in a first communications network and subscription data of the terminal in a second communications network, where the subscription data of the terminal in the first communications network includes a data network name (DNN), and the subscription data of the terminal in the second communications network includes an access point name (APN) corresponding to the DNN; allocating, by the access and mobility management network element, a bearer identifier to a bearer in a packet data network (PDN) connection corresponding to the APN; receiving, by the access and mobility management network element, a flow identifier that is of a flow in a protocol data unit (PDU) session corresponding to the DNN and that is sent by a session management network element; and sending, by the access and mobility management network element, the bearer identifier and the flow identifier to the terminal.

In this embodiment, the access and mobility management network element reserves a session resource for the second communications network, to simplify an interworking procedure between different communications networks.

With reference to the first aspect, in a first possible implementation of the first aspect, the bearer in the PDN connection corresponding to the APN is a default bearer, the flow in the PDU session corresponding to the DNN is a default flow, and before the allocating, by the access and mobility management network element, a bearer identifier to a bearer in a PDN connection corresponding to the APN, the method further includes: receiving, by the access and mobility management network element, a registration request message or a PDU session establishment request message sent by the terminal. Additionally, after the receiving, by the access and mobility management network element, a registration request message or a PDU session establishment request message, the method further includes: sending, by the access and mobility management network element, the PDU session establishment request message to the session management network element, where the PDU session establishment request message includes a bearer identifier of the default bearer.

In this embodiment, the corresponding default bearer identifier is allocated to the default flow in a process of establishing the default flow in the PDU session. As such, a session resource is reserved for the second communications network, thereby simplifying an interworking procedure between different communications networks.

With reference to the first aspect, in a second possible implementation of the first aspect, the bearer in the PDN connection corresponding to the APN is a dedicated bearer, the flow in the PDU session corresponding to the DNN is a dedicated flow, and before the receiving, by the access and mobility management network element, a flow identifier that is of a flow in a PDU session corresponding to the DNN and that is sent by a session management network element, the method further includes: receiving, by the access and mobility management network element, a dedicated bearer identifier assignment request message sent by the session management network element; and sending, by the access and mobility management network element, a dedicated bearer identifier assignment response message to the session management network element, where the dedicated bearer identifier assignment response message includes a bearer identifier of the dedicated bearer.

In this embodiment, the corresponding dedicated bearer identifier is allocated to the dedicated flow in a process of establishing the dedicated flow in the PDU session, such that a session resource is reserved for the second communications network, thereby simplifying an interworking procedure between different communications networks.

With reference to the first aspect, in a third possible implementation of the first aspect, the method further includes: receiving, by the access and mobility management network element, a handover request sent by an access network device; sending, by the access and mobility management network element, a session context request message to the session management network element; receiving, by the access and mobility management network element, a session context response message sent by the session management network element, where the session context response message includes the bearer identifier and a policy and charging control rule of the default bearer in the PDN connection, and/or the bearer identifier and a policy and charging control rule of the dedicated bearer in the PDN connection; and sending, by the access and mobility management network element, a relocation request to a mobility management entity, where the location request includes indication information, and the indication information is used to instruct the mobility management entity to reselect a serving gateway.

In this embodiment, to ensure handover of the terminal in different networks, before the handover, the first communications network reserves session management resources for the second communications network, and during the handover, the first communications network sends the session management resources to the second communications network, and the second communications network can rapidly set up a service based on the session management resources, thereby ensuring service continuity and simplifying a handover procedure.

According to a second aspect, a session management method is provided. The method includes: obtaining, by a session management network element, a flow identifier of a flow in a PDU session corresponding to a DNN of a terminal, where the DNN is a DNN in subscription data of the terminal in a first communications network; obtaining, by the session management network element, a bearer identifier of a bearer in a PDN connection corresponding to an APN of the terminal, where the APN is an APN in subscription data of the terminal in a second communications network; and sending, by the session management network element, the bearer identifier and the flow identifier to an access and mobility management network element.

With reference to the second aspect, in a first possible implementation of the second aspect, the bearer in the PDN connection corresponding to the APN is a default bearer, the flow in the PDU session corresponding to the DNN is a default flow. Additionally, the obtaining, by the session management network element, a bearer identifier of a bearer in a PDN connection corresponding to an APN of the terminal includes: receiving, by the session management network element, a PDU session establishment request message sent by the access and mobility management network element, where the PDU session establishment request message includes the bearer identifier.

With reference to the second aspect, in a second possible implementation of the second aspect, the bearer in the PDN connection corresponding to the APN is a dedicated bearer, the flow in the PDU session corresponding to the DNN is a dedicated flow. Additionally, the obtaining, by the session management network element, a bearer identifier of a bearer in a PDN connection corresponding to an APN of the terminal includes: sending, by the session management network element, a dedicated bearer identifier assignment request message to the access and mobility management network element; and receiving, by the session management network element, a dedicated bearer identifier assignment response message sent by the access and mobility management network element, where the dedicated bearer identifier assignment response message includes a bearer identifier of the dedicated bearer.

With reference to the second aspect, in a third possible implementation of the second aspect, the sending, by the session management network element, the bearer identifier and the flow identifier to an access and mobility management network element includes: sending, by the session management network element, session management information to the access and mobility management network element, where the session management information includes an authorized quality of service (QoS) rule of the flow and an authorized QoS rule of the bearer, the authorized QoS rule of the flow includes the flow identifier, and the authorized QoS rule of the bearer includes the bearer identifier.

With reference to the second aspect, in a fourth possible implementation of the second aspect, the obtaining, by a session management network element, a flow identifier of a flow in a PDU session corresponding to a DNN of a terminal includes: aggregating, by the session management network element according to a policy and charging control (PCC) rule of the terminal in the first communications network, a service data flow corresponding to the PCC rule of the terminal in the first communications network to a dedicated flow established for the terminal, where a flow identifier that is of the dedicated flow and that is obtained by the session management network element is a flow identifier of the dedicated flow established for the terminal.

In this embodiment, the session management network element aggregates, according to the PCC rule of the terminal in the first communications network, the service data flow corresponding to the PCC rule of the terminal in the first communications network to the dedicated flow established for the terminal. As such, a correspondence between a dedicated flow and a dedicated bearer can be established when a quantity of dedicated flows in a PDU session is greater than a quantity of dedicated bearers in a PDN connection.

With reference to the second aspect, in a fifth possible implementation of the second aspect, the obtaining, by the session management network element, a bearer identifier of a bearer in a PDN connection corresponding to an APN of the terminal includes: aggregating, by the session management network element according to a PCC rule of the terminal in the second communications network, a service data flow corresponding to the PCC rule of the terminal in the second communications network to a dedicated bearer established for the terminal, where the bearer identifier that is of the dedicated bearer and that is obtained by the session management network element is a bearer identifier of the dedicated bearer established for the terminal.

According to a third aspect, a policy and charging control method is provided. The method includes: obtaining, by a policy and charging network element, a service requirement of a terminal; and sending, by the policy and charging network element, a packet data unit connectivity access network (PDU-CAN) session management message to a session management network element, where the PDU-CAN session management message includes a PCC rule of the terminal in a first communications network and a PCC rule of the terminal in a second communications network.

With reference to the third aspect, in a first possible implementation of the third aspect, the policy and charging network element receives a PDU-CAN session establishment request message sent by the session management network element, where the PDU-CAN session establishment request message includes a subscription context corresponding to a DNN of the terminal in the first communications network and a PDN subscription context corresponding to an APN of the terminal in the second communications network.

With reference to the third aspect, in a second possible implementation of the third aspect, the PCC rule of the terminal in the first communications network and the PCC rule of the terminal in the second communications network include: a quality of service class identifier of the terminal in the first communications network, an authorized aggregate maximum bit rate (AMBR) Session-AMBR of a default flow in a PDU session corresponding to the DNN, a quality of service class identifier of the terminal in the second communications network, and an authorized APN-AMBR of a default bearer in a PDN connection corresponding to the APN.

With reference to the third aspect, in a third possible implementation of the third aspect, the obtaining, by a policy and charging network element, a service requirement of a terminal includes: receiving, by the policy and charging network element, the service requirement sent by the terminal or an application function network element, where the service requirement includes at least one of Internet Protocol (IP) filtering information, a media bandwidth requirement used for QoS control, or an application bandwidth requirement used for QoS control.

With reference to the third aspect, in a fourth possible implementation of the third aspect, the PCC rule of the terminal in the first communications network and the PCC rule of the terminal in the second communications network include: a quality of service class identifier of the terminal in the first communications network, a quality of service class identifier of the terminal in the second communications network, and at least one of the following: uplink and downlink packet filters, a guaranteed bit rate (GBR), a maximum bit rate (MBR), or an allocation and retention priority (ARP).

With reference to the third aspect, in a fifth possible implementation of the third aspect, the service requirement further includes a service continuity requirement.

According to a fourth aspect, an access and mobility management device is provided. The device includes: an obtaining unit configured to obtain subscription data of a terminal in a first communications network and subscription data of the terminal in a second communications network, where the subscription data of the terminal in the first communications network includes a DNN, and the subscription data of the terminal in the second communications network includes an APN corresponding to the DNN; an allocation unit configured to allocate a bearer identifier to a bearer in a PDN connection corresponding to the APN; a receiving unit configured to receive a flow identifier that is of a flow in a PDU session corresponding to the DNN and that is sent by a session management network element; and a sending unit configured to send the bearer identifier and the flow identifier to the terminal.

According to a fifth aspect, a session management device is provided. The device includes: an obtaining unit configured to: obtain a flow identifier of a flow in a PDU session corresponding to a DNN of a terminal; and obtain a bearer identifier of a bearer in a PDN connection corresponding to an APN of the terminal, where the DNN is a DNN in subscription data of the terminal in a first communications network, and the APN is an APN in subscription data of the terminal in a second communications network. The device further includes a sending unit configured to send the bearer identifier and the flow identifier to an access and mobility management network element.

According to a sixth aspect, a policy and charging control device is provided. The device includes: an obtaining unit configured to obtain a service requirement of a terminal; and a sending unit configured to send a PDU-CAN session management message to a session management network element, where the PDU-CAN session management message includes a PCC rule of the terminal in a first communications network and a PCC rule of the terminal in a second communications network.

According to a seventh aspect, a computer program product is provided. The computer program product includes a computer program instruction. When the computer program instruction is executed on a computer, the computer performs the method according to any one of the first aspect to the third aspect.

DESCRIPTION OF EMBODIMENTS

A terminal in embodiments of this disclosure may include various handheld devices, in-vehicle devices, wearable devices, and computing devices that have a radio communication function or another processing device connected to a wireless modem, and a user equipment (UE), a mobile station (MS), a terminal device, and the like that are in various forms. For ease of description, in this disclosure, an example in which the terminal is a UE is used for description. The technical solutions in the embodiments of this disclosure are described below with reference to the accompanying drawings.

Figures 1, 2:
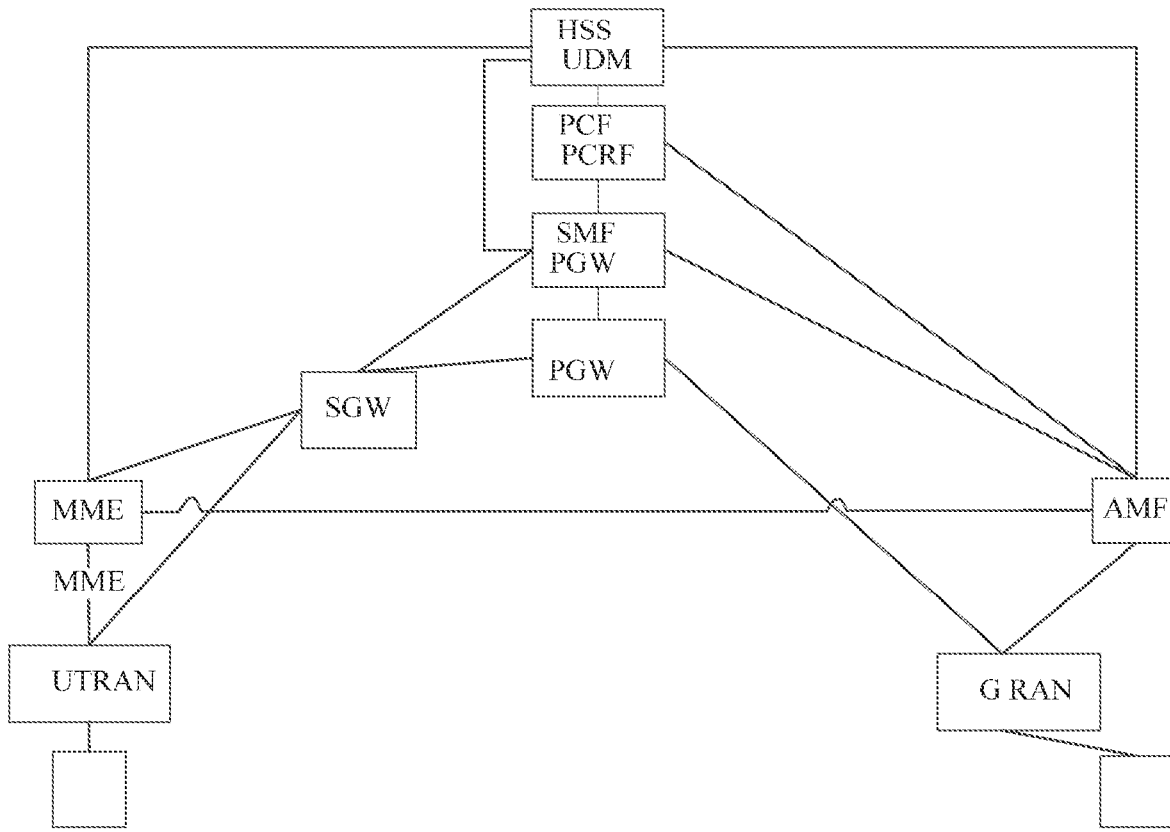
FIG. 1 is a schematic diagram of an architecture applied to the technical solutions according to an embodiment of this disclosure.
FIG. 2 is a schematic flowchart of a session management method according to an embodiment of this disclosure.

FIG. 1 is a schematic diagram of a communications architecture applied to the technical solutions according to an embodiment of this disclosure. In the communications architecture, a UE accesses a core network using an evolved universal terrestrial radio access network (EUTRAN). Alternatively, the UE may access the core network using a next generation radio access network (NG RAN) device. A device in the core network includes a mobility management entity (MME), a serving gateway (SGW), a subscriber server, a policy and charging network element, a session management network element, a user-plane function network element, and an access and mobility management network element. Optionally, the access and mobility management network element may be an access and mobility management function (AMF). Optionally, in this disclosure, network elements may be connected using interfaces shown in the accompanying drawings. For example, the MME and the AMF are connected using an Nx interface, and the SGW and the user-plane function network element are connected using an S5-U interface.

In this embodiment, the subscriber server is configured to store subscription data of the UE. Optionally, the subscriber server may include a home subscriber server (HSS) and unified data management (UDM). The HSS and the UDM are integrally deployed. A UDM function may be added to the HSS, or an HSS function may be added to the UDM, or both the HSS function and the UDM function are implemented in another device. In FIG. 1, the subscriber server is represented using HSS+UDM.

The policy and charging network element includes a policy and charging rules function (PCRF) and a policy control function (PCF). The PCRF and the PCF are integrally deployed. The PCF function may be added to the PCRF, or the PCRF function may be added to the PCF, or both the PCRF function and the PCF function are implemented in another device. In FIG. 1, the policy and charging network element is represented using PCRF+PCF.

The session management network element includes a session management function (SMF) and a packet data network (PDN) gateway-control plane (PGW-C). The SMF and the PGW-C are integrally deployed. A PGW-C function may be added to the SMF, or the SMF function may be added to the PGW-C, or both the SMF and the PGW-C function are implemented in another device. In FIG. 1, the session management network element is represented using SMF+PGW-C.

The user-plane function network element includes a user plane function (UPF) and a packet data network gateway-user plane (PGW-U). The UPF and the PGW-U are integrally deployed. A PGW-U function may be added to the UPF, or the UPF function may be added to the PGW-U, or both the UPF and the PGW-U function are implemented in another device. In FIG. 1, the user-plane function network element is represented using UPF+PGW-U.

The communications architecture shown in FIG. 1 includes a first communications network and a second communications network. The first communications network includes the AMF, the UDM, the PCF, the SMF, and the UPF. Optionally, the first communications network may be a 5G communications network. The second communications network includes the EUTRAN, the MME, the SGW, the HSS, the PCRF, the PGW-C, and PGW-U. Optionally, the second communications network may be a 4.5G or 4G communications network. In the communications architecture shown in FIG. 1, the UE may access the first communications network or may access the second communications network, and interworking of the UE between the first communications network and the second communications network may be implemented.

FIG. 2 is a schematic flowchart of a session management method according to an embodiment of this disclosure. In this embodiment, the session management method includes the following steps.

201. An access and mobility management network element obtains subscription data of a terminal in a first communications network and subscription data of the terminal in a second communications network, where the subscription data of the terminal in the first communications network includes a data network name (DNN), and the subscription data of the terminal in the second communications network includes an access point name (APN) corresponding to the DNN. Optionally, the access and mobility management network element is an AMF.

Optionally, the first communications network is a 5G communications network. The second communications network may be a 4G communications network.

Optionally, the subscription data of the terminal in the first communications network further includes a subscription context corresponding to the DNN, and the subscription data of the terminal in the second communications network further includes a packet data network (PDN) subscription context corresponding to the APN.

Optionally, the DNN includes a default DNN, the APN includes a default APN, and the default DNN corresponds to the default APN. Optionally, the DNN includes a non-default DNN, the APN includes a non-default APN, and the non-default DNN corresponds to the non-default APN.

Optionally, that an access and mobility management network element obtains subscription data of a terminal in a first communications network and subscription data of the terminal in a second communications network includes: The access and mobility management network element sends a location update request message to a subscriber server; and the access and mobility management network element receives a location update response message sent by the subscriber server, where the location update response message includes the subscription data of the terminal in the first communications network and the subscription data of the terminal in the second communications network. Optionally, the subscriber server is a UDM.

Optionally, that the access and mobility management network element sends a location update request to a subscriber server includes: The access and mobility management network element sends a first location update request to the UDM, and the access and mobility management network element sends a second location update request to the UDM. Additionally, that the access and mobility management network element receives a location update response sent by the subscriber server, where the location update response includes the subscription data of the terminal in the first communications network and the subscription data of the terminal in the second communications network includes: The access and mobility management network element receives a first location update response sent by the UDM, where the first location update response includes the subscription data of the terminal in the first communications network; and the access and mobility management network element receives a second location update response sent by the UDM, where the second location update response includes the subscription data in the second communications network.

202. The access and mobility management network element allocates a bearer identifier to a bearer (Default bearer) in a PDN connection corresponding to the APN.

Optionally, a bearer identifier of a default bearer corresponds to a flow identifier of a default flow. For example, the bearer identifier of the default bearer is in a one-to-one correspondence with the flow identifier of the default flow.

Optionally, a bearer identifier of a dedicated bearer corresponds to a flow identifier of a dedicated flow. For example, the bearer identifier of the dedicated bearer is in a one-to-one correspondence with the flow identifier of the dedicated flow, or the bearer identifier of the dedicated bearer corresponds to a flow identifier of a flow obtained after a plurality of dedicated flows are aggregated, or a bearer identifier of a bearer obtained after a plurality of dedicated bearers are aggregated corresponds to a flow identifier of a dedicated flow.

Optionally, the bearer in the PDN connection corresponding to the APN is a default bearer, and a flow in a PDU session corresponding to the DNN is a default flow. Before the access and mobility management network element allocates the bearer identifier to the bearer in the PDN connection corresponding to the APN, the method further includes: The access and mobility management network element receives a registration request message or a PDU session establishment request message sent by the terminal. After the access and mobility management network element receives the registration request message or the PDU session establishment request message, the method further includes: The access and mobility management network element sends the PDU session establishment request message to a session management network element, where the PDU session establishment request message includes a bearer identifier of the default bearer. Optionally, the session management network element is an SMF.

Optionally, the registration request message or the PDU session establishment request message further includes indication information. The indication information is used to indicate to the access and mobility management network element that the terminal has a capability to perform communication in the first communications network and the second communications network, and/or is used to indicate to the access and mobility management network element that the terminal has a single-registration or dual-registration capability.

Optionally, the bearer in the PDN connection corresponding to the APN is a dedicated bearer, and a flow in a PDU session corresponding to the DNN is a dedicated flow. Before the access and mobility management network element receives a flow identifier that is of the flow in the PDU session corresponding to the DNN and that is sent by a session management network element, the method further includes: The access and mobility management network element receives a dedicated bearer identifier assignment request message sent by the session management network element, and the access and mobility management network element sends a dedicated bearer identifier assignment response message to the session management network element, where the dedicated bearer identifier assignment response message includes a bearer identifier of the dedicated bearer.

Optionally, the PDU session establishment request message sent by the access and mobility management network element to the session management network element further includes the subscription context corresponding to the DNN and the PDN subscription context corresponding to the APN. Optionally, the PDU session establishment request message further includes indication information. The indication information is used to indicate to the session management network element that the terminal has a capability to perform communication in the first communications network and the second communications network, and/or is used to indicate to the session management network element that the terminal has a single-registration capability.

203. The access and mobility management network element receives a flow identifier (flow ID) that is of a flow in a PDU session corresponding to the DNN and that is sent by a session management network element.

Optionally, before the access and mobility management network element receives a session management message sent by the session management network element, the access and mobility management network element determines that the terminal has the capability to perform communication in the first communications network and the second communications network and that an interface exists between the access and mobility management network element and a mobility management entity, and/or that the terminal has the single-registration capability.

Optionally, before the access and mobility management network element receives the session management message sent by the session management network element, the access and mobility management network element selects the session management network element based on a fact that the terminal has the capability to perform communication in the first communications network and the second communications network and that the interface exists between the access and mobility management network element and the mobility management entity, and/or that the terminal has the single-registration capability.

Optionally, the access and mobility management network element receives the session management information sent by the session management network element, and the session management information includes an authorized quality of service (QoS) rule of the flow and an authorized QoS rule of the bearer. The authorized QoS rule of the flow includes the flow identifier, and the authorized QoS rule of the bearer includes the bearer identifier.

Optionally, the session management information includes the flow identifier of the default flow, an authorized session aggregate maximum bit rate (Session-AMBR) of the default flow, the bearer identifier of the default bearer, and an authorized APN-AMBR of the default bearer.

Optionally, the session management information includes a flow identifier of a guaranteed bit rate (GBR) flow, an uplink packet filter of the GBR flow, a bearer identifier of a GBR dedicated bearer, and a traffic flow template (TFT) of the GBR dedicated bearer. Optionally, content included in the uplink packet filter is the same as content included in the uplink traffic flow template herein.

204. The access and mobility management network element sends the bearer identifier and the flow identifier to the terminal.

Optionally, the access and mobility management network element sends the session management information to the terminal. The session management information includes the bearer identifier and the flow identifier.

Optionally, the method in this embodiment further includes: The access and mobility management network element receives a handover request sent by an access network device; the access and mobility management network element sends a session context request message to the session management network element; the access and mobility management network element receives a session context response message sent by the session management network element, where the session context response message includes the bearer identifier and a policy and charging control (PCC) rule of the default bearer in the PDN connection, and/or the bearer identifier and a PCC rule of the dedicated bearer in the PDN connection; and the access and mobility management network element sends a relocation request to the mobility management entity, where the relocation request includes indication information, and the indication information is used to instruct the mobility management entity to reselect a serving gateway. Optionally, address information of the serving gateway may be set to 0.0.0.0, to instruct the mobility management entity to reselect the serving gateway.

Figure 3:
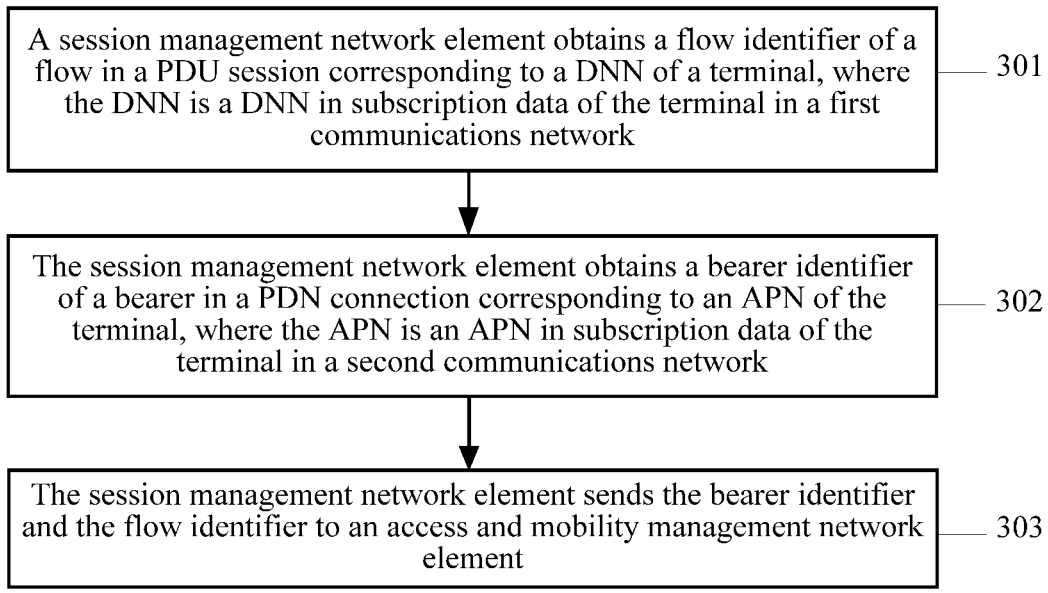
FIG. 3 is another schematic flowchart of a session management method according to an embodiment of this disclosure.

FIG. 3 is another schematic flowchart of a session management method according to an embodiment of this disclosure. In this embodiment, for content similar to that in the embodiment of FIG. 2, refer to descriptions corresponding to the embodiment of FIG. 2, and details are not described herein again. The session management method includes the following steps.

301. A session management network element obtains a flow identifier of a flow in a PDU session corresponding to a DNN of a terminal, where the DNN is a DNN in subscription data of the terminal in a first communications network.

Optionally, the session management network element allocates the flow identifier to the flow in the PDU session corresponding to the DNN of the terminal.

Optionally, the session management network element aggregates, according to a PCC rule of the terminal in the first communications network, a service data flow corresponding to the PCC rule of the terminal in the first communications network to a dedicated flow established for the terminal, and a flow identifier that is of a dedicated flow and that is obtained by the session management network element is a flow identifier of the dedicated flow established for the terminal.

302. The session management network element obtains a bearer identifier of a bearer in a packet data network (PDN) connection corresponding to an access point name (APN) of the terminal, where the APN is an APN in subscription data of the terminal in a second communications network.

The subscription data of the terminal in the first communications network further includes a subscription context corresponding to the DNN, and the subscription data of the terminal in the second communications network further includes a PDN subscription context corresponding to the APN. Optionally, a PDU session establishment request message received by the session management network element further includes the subscription context corresponding to the DNN and the PDN subscription context corresponding to the APN. Optionally, the PDU session establishment request message further includes indication information. The indication information is used to indicate to the session management network element that the terminal has a capability to perform communication in the first communications network and the second communications network, and/or is used to indicate to the session management network element that the terminal has a single-registration capability.

Optionally, the bearer in the PDN connection corresponding to the APN is a default bearer, and the flow in the PDU session corresponding to the DNN is a default flow. That the session management network element obtains a bearer identifier of a bearer in a PDN connection corresponding to an APN of the terminal includes: The session management network element receives the PDU session establishment request message sent by an access and mobility management network element, where the PDU session establishment request message includes the bearer identifier.

Optionally, the session management network element aggregates, according to a PCC rule of the terminal in the second communications network, a service data flow corresponding to the PCC rule of the terminal in the second communications network to a dedicated bearer established for the terminal, and a bearer identifier that is of a dedicated bearer and that is obtained by the session management network element is a bearer identifier of the dedicated bearer established for the terminal.

Optionally, the bearer in the PDN connection corresponding to the APN is a dedicated bearer, and the flow in the PDU session corresponding to the DNN is a dedicated flow. That the session management network element obtains a bearer identifier of a bearer in a PDN connection corresponding to an APN of the terminal includes: The session management network element sends a dedicated bearer identifier assignment request message to the access and mobility management network, and the session management network element receives a dedicated bearer identifier assignment response message sent by the access and mobility management network element, where the dedicated bearer identifier assignment response message carries a bearer identifier of the dedicated bearer.

303. The session management network element sends the bearer identifier and the flow identifier to an access and mobility management network element.

Optionally, that the session management network element sends the bearer identifier and the flow identifier to an access and mobility management network element includes: The session management network element sends session management information to the access and mobility management network element, where the session management information includes an authorized QoS rule of the flow and an authorized QoS rule of the bearer, the authorized QoS rule of the flow includes the flow identifier, and the authorized QoS rule of the bearer includes the bearer identifier.

Optionally, the session management information includes a flow identifier of the default flow, an authorized Session-AMBR of the default flow, a bearer identifier of the default bearer, and an authorized APN-AMBR of the default bearer.

Optionally, the session management information includes a flow identifier of a GBR flow, an uplink (UL) packet filter of the GBR flow, a bearer identifier of a GBR dedicated bearer, and an uplink traffic flow template (TFT) of the GBR dedicated bearer. Optionally, content included in the uplink packet filter is the same as content included in the uplink traffic flow template herein.

Optionally, the method in this embodiment may further include: The session management network element sends a PDU connectivity access network (PDU-CAN) session establishment request message to a policy and charging network element, where the PDU-CAN session establishment request message includes the subscription context corresponding to the DNN and the PDN subscription context corresponding to the APN; and the session management network element receives a PDU-CAN session establishment response message sent by the policy and charging network element, where the PDU-CAN session establishment response message includes a PCC rule of the terminal in the first communications network and a PCC rule of the terminal in the second communications network. Optionally, the PDU-CAN session establishment request message further includes indication information. The indication information is used to indicate to the policy and charging network element that the terminal has the capability to perform communication in the first communications network and the second communications network, and/or is used to indicate to the policy and charging network element that the terminal has the single-registration capability.

Optionally, the PCC rules include a quality of service class identifier (QCI) of the terminal in the first communications network, a QCI of the terminal in the second communications network, and at least one of the following:

uplink and downlink packet filters (UL+DL Packet filters), a guaranteed bit rate (GBR), a maximum bit rate (MBR), or an ARP.

Optionally, the method in this embodiment may further include: The session management network element receives a PDU-CAN session modification request message sent by a policy and charging network element, where the PDU-CAN session modification request message includes the PCC rule of the terminal in the first communications network and the PCC rule of the terminal in the second communications network. Optionally, the policy and charging network element is a PCF.

Figure 4:
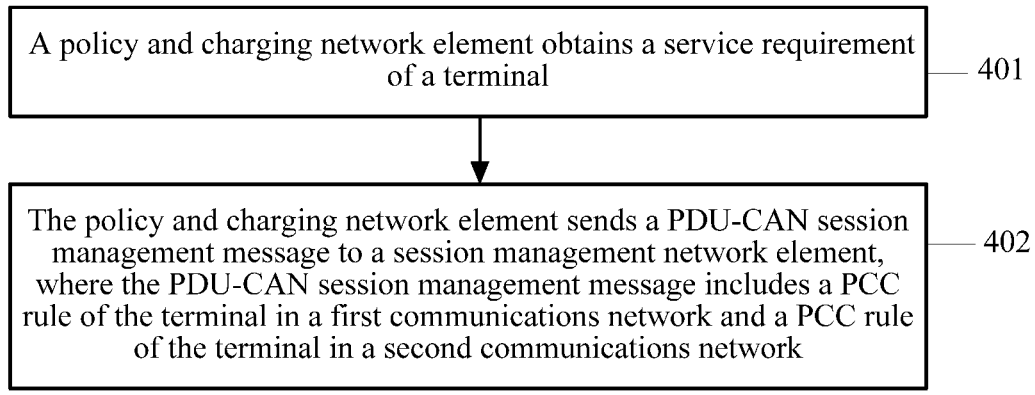
FIG. 4 is a schematic flowchart of a policy and charging control method according to an embodiment of this disclosure.

FIG. 4 is a schematic flowchart of a policy and charging control method according to an embodiment of this disclosure. In this embodiment, for content similar to that in the embodiments of FIG. 2 and FIG. 3, refer to descriptions corresponding to the embodiments of FIG. 2 and FIG. 3, and details are not described herein again. The policy and charging control method includes the following steps.

401. A policy and charging network element obtains a service requirement of a terminal.

Optionally, that a policy and charging network element obtains a service requirement of a terminal includes: The policy and charging network element receives a PDU-CAN session establishment request message sent by a session management network element, where the PDU-CAN session establishment request message includes a subscription context corresponding to a data network name (DNN) of the terminal in a first communications network and a PDN subscription context corresponding to an APN of the terminal in a second communications network. Optionally, the PDU-CAN session establishment request message further includes indication information. The indication information is used to indicate to the policy and charging network element that the terminal has a capability to perform communication in the first communications network and the second communications network, and/or is used to indicate to the policy and charging network element that the terminal has a single-registration capability.

Optionally, that a policy and charging network element obtains a service requirement of a terminal includes: The policy and charging network element receives the service requirement sent by the terminal or an application function network element, where the service requirement includes at least one of Internet Protocol (IP) filtering information, a media bandwidth requirement used for QoS control, or an application bandwidth requirement used for QoS control. Optionally, the application function network element is an application function (AF). Optionally, the policy and charging network element receives a PDU-CAN session modification request from the session management network element or receives a service notification message from the application function. The policy and charging network element receives the PDU-CAN session modification request from the session management network element in a dedicated flow establishment process initiated by a UE, and the policy and charging network element receives the service notification message from the application function in a dedicated flow establishment process initiated by the AF. The PDU-CAN session modification request or the service notification message includes the service requirement of the terminal. Optionally, the service requirement further includes a service continuity requirement.

402. The policy and charging network element sends a PDU-CAN session management message to a session management network element, where the PDU-CAN session management message includes a PCC rule of the terminal in a first communications network and a PCC rule of the terminal in a second communications network.

Optionally, the PDU-CAN session management message is a PDU-CAN session establishment response message. The PCC rule of the terminal in the first communications network and the PCC rule of the terminal in the second communications network include: a QCI of the terminal in the first communications network, an authorized Session-AMBR of a default flow in a PDU session corresponding to the DNN, a QCI of the terminal in the second communications network, and an authorized APN-AMBR of a default bearer in a PDN connection corresponding to the APN.

Optionally, the PDU-CAN session management message is a PDU-CAN session modification response message or a PDU-CAN session modification request message. In the dedicated flow establishment process initiated by the UE, the PDU-CAN session management message is the PDU-CAN session modification response message. In the dedicated flow establishment process initiated by the AF, the PDU-CAN session management message is the PDU-CAN session modification request message. The PCC rule of the terminal in the first communications network and the PCC rule of the terminal in the second communications network include: a QCI of the terminal in the first communications network, a QCI of the terminal in the second communications network, and at least one of the following: uplink and downlink packet filters (UL+DL Packet filters), a GBR, an MBR, or an ARP.

The embodiments of this disclosure are described below using an example in which the first communications network is a 5G communications network and the second communications network is a 4G network. To clearly and briefly describe the embodiments of this disclosure, only step procedures and network elements that are related to this disclosure are shown in the embodiments of this disclosure. Others are technical content well known to a person skilled in the art, and are not shown in the accompanying drawings. For example, an access network device that is configured to receive information from a UE or send information to a UE using an air interface is not shown in the accompanying drawings.

In accompanying drawings of FIG. 5 to FIG. 9, for clear and brief descriptions, an SMF, a PCF, a UPF, and UDM are separately used to represent corresponding core network devices that are integrally deployed in the 5G network and the 4G network.

Figure 5:
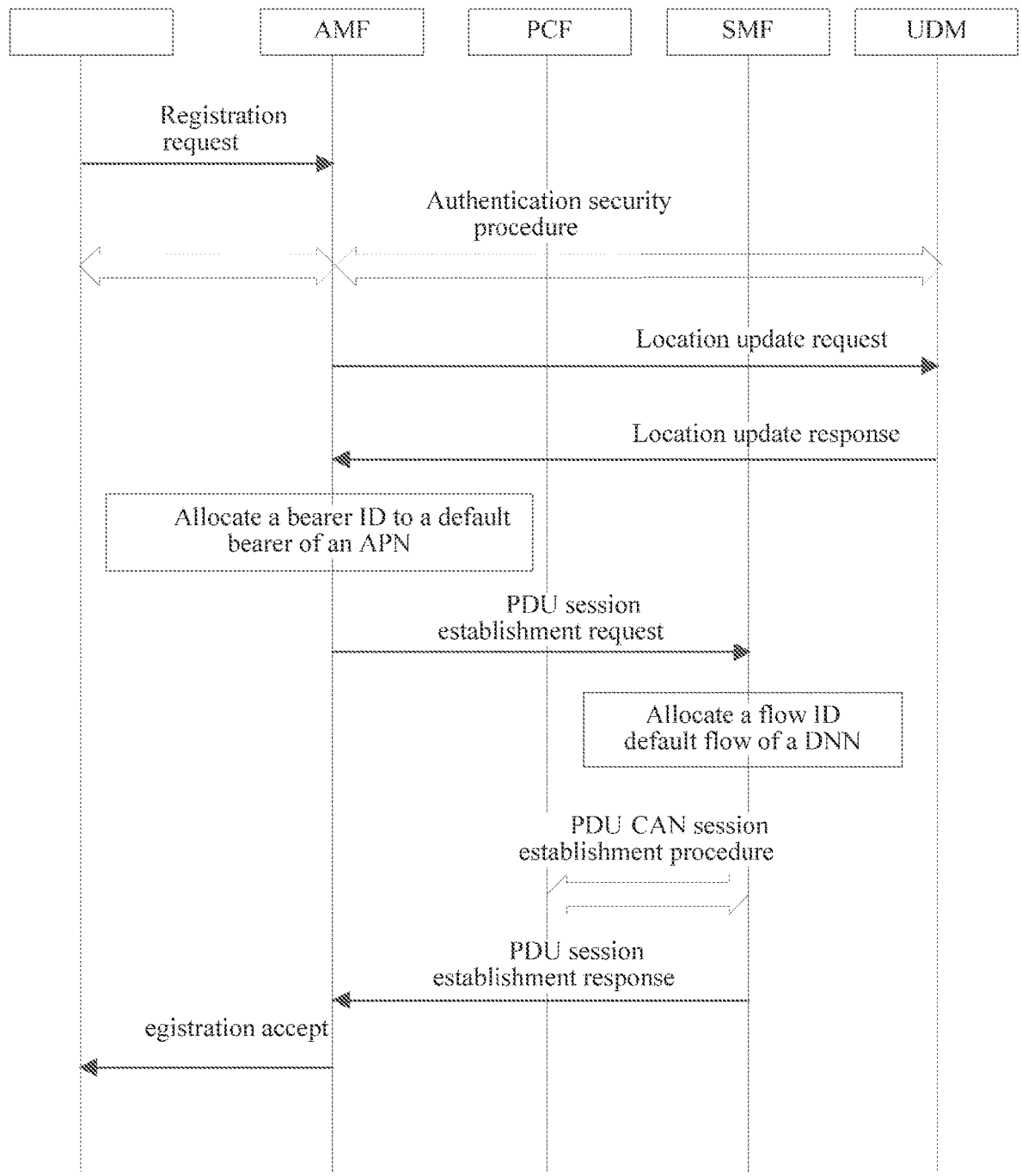
FIG. 5 is still another schematic flowchart of a session management method according to an embodiment of this disclosure.

FIG. 5 is still another schematic flowchart of a session management method according to an embodiment of this disclosure. In this embodiment, for content similar to that in the embodiments of FIG. 2 to FIG. 4, refer to descriptions corresponding to the embodiments of FIG. 2 to FIG. 4, and details are not described herein again. FIG. 5 shows a session management method in a UE registration process. The session management method in this embodiment includes the following steps.

501. UE sends a registration request to an AMF.

Optionally, the registration request may include indication information. The indication information is used to indicate that the UE has a capability to perform communication in a 5G network and a 4G network, and/or is used to indicate to the AMF that the UE has a single-registration or dual-registration capability.

502. The UE and a network side device complete an authentication and security procedure.

503. The AMF sends a location update request message to UDM.

Optionally, when an HSS and the UDM are integrally deployed, the AMF sends the location update request message to the UDM. The location update request message includes indication information. The indication information is used to indicate that the UE has the capability to perform communication in the 5G network and the 4G network. Optionally, the indication information may be interworking indication information.

Optionally, when an HSS and the UDM are integrally deployed, the AMF sends a first location update request and a second location update request message to the UDM. Optionally, if the AMF changes compared with previous registration or the AMF does not have an authorized subscription context for the current UE or the AMF does not have an authorized context corresponding to a subscription permanent identifier (SUPI) provided by the UE, the AMF may initiate a location update procedure.

504. The AMF receives a location update response message sent by the UDM.

The location update response message includes subscription data of the UE in the 5G network and subscription data of the UE in the 4G network. The subscription data in the 5G network includes a DNN, and the subscription data in the 4G network includes an APN.

Optionally, the DNN includes a default DNN, and the APN includes a default APN. Optionally, the DNN includes a non-default DNN, and the APN includes a non-default APN. Optionally, the subscription data in the 5G network may include only one default DNN. The subscription data in the 5G network may further include one or more non-default DNNs. The subscription data in the 4G network may include only one default APN. The subscription data in the 4G network may further include one or more non-default APNs, for example, an IP multimedia subsystem (IMS) APN or a non-3rd Generation Partnership Project (non-3GPP) APN.

Optionally, the default DNN is in a one-to-one correspondence with the default APN, and the non-default DNN is in a one-to-one correspondence with the non-default APN. Alternatively, the non-default DNN may not be in a one-to-one correspondence with the non-default APN, for example, a quantity of non-default DNNs is greater than a quantity of non-default APNs.

Optionally, a session corresponding to the DNN may include only one default flow. A PDU session corresponding to the DNN may further include one or more dedicated flows. A PDN connection corresponding to the APN may include only one default bearer. A PDN connection corresponding to the DNN may further include one or more dedicated bearers.

Optionally, the subscription data of the UE in the 5G network further includes a subscription context corresponding to the DNN. The subscription data of the UE in the 4G network further includes a PDN subscription context corresponding to the APN. Optionally, the PDN subscription context includes a QoS parameter such as a subscription APN-AMBR and/or a subscription QoS profile.

Optionally, the location update response received by the AMF includes a correspondence between the DNN and the APN. For example, the correspondence between the DNN and the APN may be represented using a list, or the correspondence may be represented using a location relationship between the DNN and the APN in the message, and details are not described herein again.

Optionally, after receiving the location update response, the AMF may obtain the correspondence between the DNN and the APN based on a domain name in the subscription data of the UE in the 5G network and a domain name in the subscription data of the UE in the 4G network. For example, the PDN subscription context includes 4g.ims.org, and the subscription context corresponding to the DNN includes 5g.ims.org, such that the AMF obtains the correspondence between the DNN and the APN based on a fact that the domain names each include ims.org.

Optionally, when the HSS and the UDM are integrally deployed, the AMF receives the location update response sent by the UDM. The location update response includes the subscription data of the UE in the 5G network and the subscription data of the UE in the 4G network.

Optionally, when the HSS and the UDM are integrally deployed, the AMF receives a first location update response and a second location update response that are sent by the UDM. The first location update response includes the subscription data of the UE in the 5G network, and the second location update response includes the subscription data of the UE in the 4G network.

505. The AMF allocates a bearer identifier (bearer ID) to a default bearer in a PDN connection corresponding to an APN.

506. The AMF sends a PDU session establishment request message to an SMF, where the PDU session establishment request message includes the bearer identifier that is of the default bearer and that is allocated by the AMF.

Optionally, the PDU session establishment request message may further include indication information. The indication information is used to indicate that the UE has the capability to perform communication in the 5G network and the 4G network, and/or is used to indicate to the SMF that the UE has the single-registration capability.

Optionally, the PDU session establishment request message may further include the PDN subscription context corresponding to the APN and the subscription context corresponding to the DNN.

Optionally, before sending the PDU session establishment request message to the SMF, the AMF may select the SMF based on a fact that the UE has the capability to perform communication in the 5G network and the 4G network and that a communications interface exists between the AMF and an MME, and/or that the UE has the single-registration capability.

507. The SMF allocates a flow identifier to a default flow in a PDU session corresponding to a DNN.

Optionally, the flow identifier that is of the default flow and that is allocated by the SMF is in a one-to-one correspondence with the bearer identifier that is of the default bearer and that is allocated by the AMF.

508. The SMF obtains a PCC rule of the UE in a 5G network and a PCC rule of the UE in a 4G network using a PDU-CAN session establishment procedure.

Optionally, the PCC rules include a QCI of the UE in the 5G network, an authorized AMBR of the PDU session corresponding to the DNN, a QCI of the UE in the 4G network, an authorized AMBR of the PDN connection corresponding to the APN, and an ARP.

Optionally, the SMF sends the PDU-CAN session establishment request message to a PCF. The PDU-CAN session establishment request message includes the subscription context corresponding to the DNN and the PDN subscription context corresponding to the APN, and may further include indication information. The indication information is used to indicate that the UE has the capability to perform communication in the 5G network and the 4G network, and/or is used to indicate to the PCF that the UE has the single-registration capability. The SMF receives a PDU-CAN session establishment response message sent by the PCF. The PDU-CAN session establishment response message includes the PCC rule of the UE in the 5G network and the PCC rule of the UE in the 4G network.

In this embodiment, step 507 may be performed before step 508, or step 508 may be performed before step 507. This is not limited herein.

509. The SMF sends a PDU session establishment response message to the AMF, where the PDU session establishment response message includes the flow identifier that is of the default flow in the PDU session corresponding to the DNN and that is allocated by the SMF.

Optionally, the PDU session establishment response message may further include the bearer identifier allocated by the AMF to the default bearer in the PDN connection corresponding to the APN.

Optionally, the PDU session establishment response message may further include session management information. The session management information includes an authorized QoS rule of the default flow in the PDU session and an authorized QoS rule of the default bearer in the PDN connection. Optionally, the authorized QoS rule of the default flow in the PDU session includes the flow identifier of the default flow, and the authorized QoS rule of the default bearer in the PDN connection includes the bearer identifier of the default bearer.

Optionally, the authorized QoS rule of the default flow in the PDU session may further include the authorized AMBR of the PDU session. The authorized QoS rule of the default bearer in the PDN connection includes the authorized AMBR of the PDN connection.

510. The AMF sends a registration accept message to the UE, where the registration accept message includes the flow identifier that is of the default flow and that is allocated by the SMF and the bearer identifier that is of the default bearer and that is allocated by the AMF.

Optionally, the registration accept message may further include the authorized QoS rule of the default flow in the PDU session and the authorized QoS rule of the default bearer in the PDN connection.

Optionally, the registration accept message includes the session management information included in the PDU session establishment response message.

In this embodiment, in a UE registration process, the AMF obtains the subscription data of the UE in the 5G network and the subscription data of the UE in the 4G network in advance, and the AMF allocates the corresponding default bearer in the 4G network to the default flow in the session in a PDU session establishment process in the 5G network, thereby avoiding a case in which a correspondence between the default flow in the PDU session in the 5G network and the default bearer in the PDN connection in the 4G network is established using a mapping method. According to the method in this embodiment, interworking of the UE in different networks is simpler. For example, when the UE is handed over from the 5G network to the 4G network, a procedure is simpler.

Figure 6:
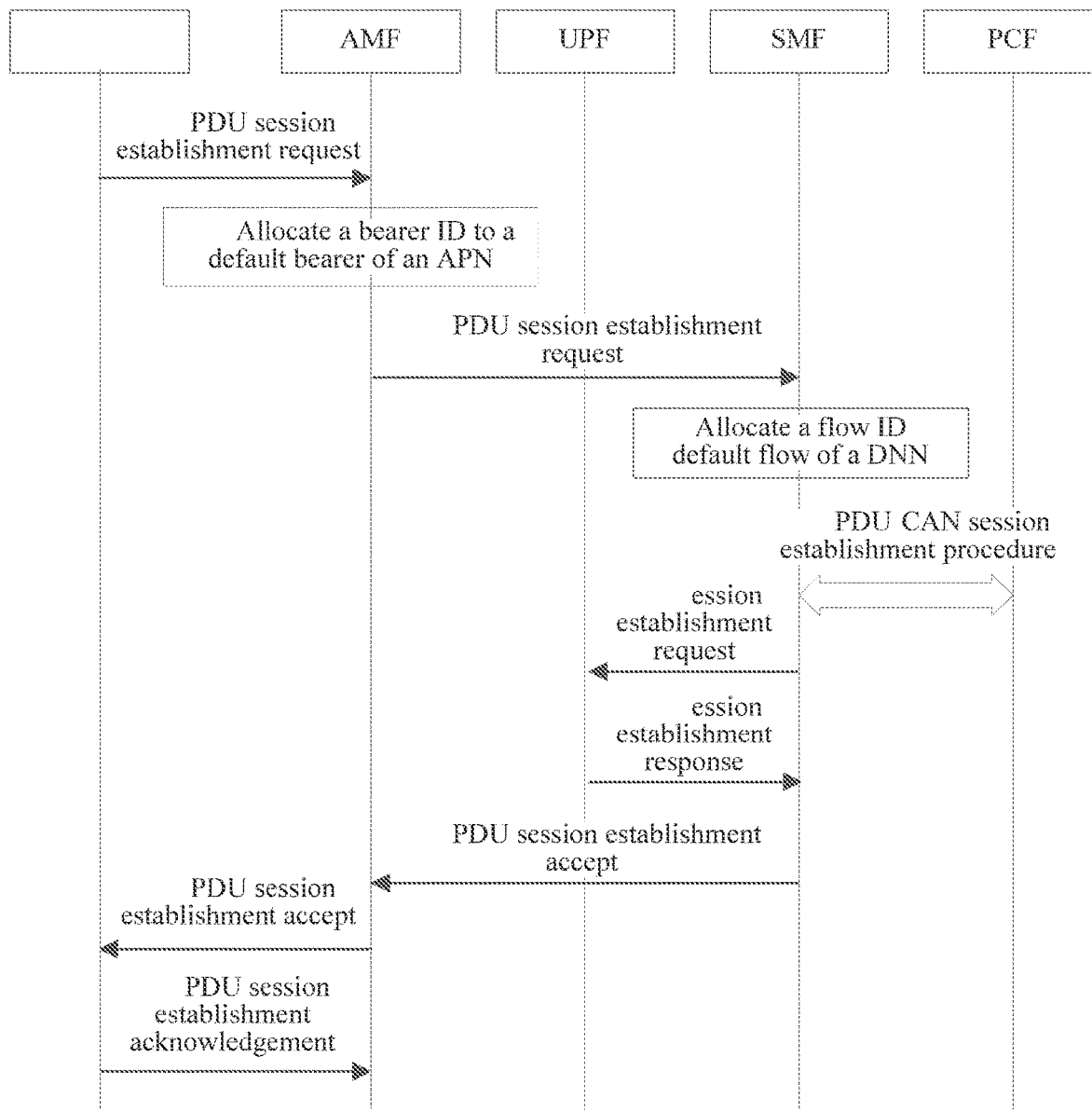
FIG. 6 is yet another schematic flowchart of a session management method according to an embodiment of this disclosure.

FIG. 6 is yet another schematic flowchart of a session management method according to an embodiment of this disclosure. In this embodiment, for content similar to that in the embodiments of FIG. 2 to FIG. 5, refer to descriptions corresponding to the embodiments of FIG. 2 to FIG. 5, and details are not described herein again. FIG. 6 shows a session management method in a procedure in which UE actively initiates a PDU session. The session management method in this embodiment includes the following steps.

601. UE sends a PDU session establishment request message to an AMF.

Optionally, the PDU session establishment request message may include indication information. The indication information is used to indicate that the UE has a capability to perform communication in a 5G network and a 4G network, and/or is used to indicate to an SMF that the UE has a single-registration or dual-registration capability.

602. The AMF allocates a bearer identifier to a default bearer in a PDN connection corresponding to an APN.

603. The AMF sends the PDU session establishment request message to an SMF.

Content in this step is similar to that in step 506, and details are not described herein again.

604. The SMF allocates a flow identifier to a default flow in a PDU session corresponding to a DNN.

Content in this step is similar to that in step 507, and details are not described herein again.

605. The SMF obtains a PCC rule of the UE in a 5G network and a PCC rule of the UE in a 4G network using a PDU-CAN session establishment procedure.

Content in this step is similar to that in step 508, and details are not described herein again.

606. The SMF sends a session establishment request message to a UPF.

Optionally, the session establishment request message includes indication information. The indication information is used to indicate that the UE has the capability to perform communication in the 5G network and the 4G network.

Optionally, when the UPF and a PGW-U are integrally deployed, the session establishment request message may be an N4 session establishment request message. When the UPF and the PGW-U are separately deployed, the SMF sends the N4 session establishment request message to the UPF, and the SMF sends an Sxb session establishment request message to the PGW-U.

607. The SMF receives a session establishment response message sent by the UPF, where the session establishment response message includes a tunnel ID of the UPF and a tunnel ID of a PGW-U.

Optionally, when the UPF and the PGW-U are separately deployed, the SMF receives, using an N4 interface, the session establishment response message sent by the UPF, and the session establishment response message includes the tunnel ID of the UPF. The SMF receives, using an Sxb interface, a session establishment response message sent by the PGW-U, and the session establishment response message includes the tunnel ID of the PGW-U.

The SMF establishes a data transmission channel to the UPF using step 606 and step 607.

608. The SMF sends a PDU session establishment response message to the AMF.

Content in this step is similar to that in step 509, and details are not described herein again.

609. The AMF sends a PDU session establishment accept message to the UE, where the PDU session establishment accept message includes the flow identifier that is of the default flow and that is allocated by the SMF and the bearer identifier that is of the default bearer and that is allocated by the AMF.

Optionally, the PDU session establishment accept message may further include an authorized QoS rule of the default flow in the PDU session and an authorized QoS rule of the default bearer in the PDN connection.

Optionally, the PDU session establishment accept message includes session management information included in the PDU session establishment response message in step 608.

610. The AMF receives a PDU session establishment acknowledgement (ACK) message sent by the UE.

In this embodiment, in a PDU session establishment process initiated by the UE, the AMF allocates the corresponding default bearer in the 4G network to the default flow in the session, thereby avoiding a case in which a correspondence between the default flow in the PDU session in the 5G network and the default bearer in the PDN connection in the 4G network is established using a mapping method. According to the method in this embodiment, interworking of the UE in different networks is simpler. For example, when the UE is handed over from the 5G network to the 4G network, a procedure is simpler.

Figure 7:
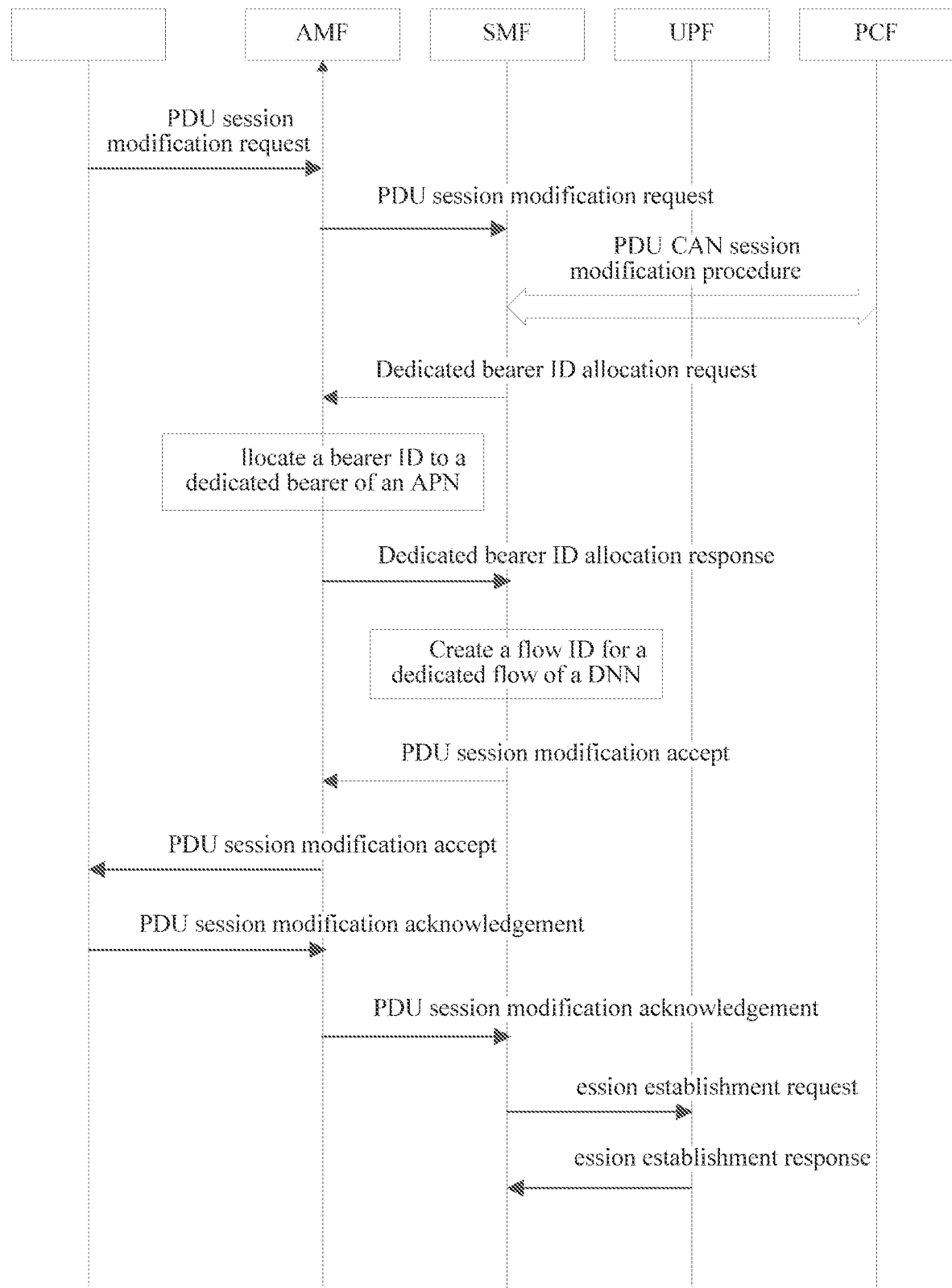
FIG. 7 is still yet another schematic flowchart of a session management method according to an embodiment of this disclosure.

FIG. 7 is still yet another schematic flowchart of a session management method according to an embodiment of this disclosure. In this embodiment, for content similar to that in the embodiments of FIG. 2 to FIG. 6, refer to descriptions corresponding to the embodiments of FIG. 2 to FIG. 6, and details are not described herein again. FIG. 7 shows a procedure in which a UE initiates establishment of a dedicated flow in a PDU session. A session management method in this embodiment includes the following steps.

701. UE sends a PDU session modification request message to an AMF.

Optionally, the PDU session modification request message includes a service requirement of the UE. The service requirement includes at least one of Internet Protocol (IP) filtering information, a media bandwidth requirement used for QoS control, or an application bandwidth requirement used for QoS control.

Optionally, the service requirement may further include a service continuity requirement.

702. The AMF sends the PDU session modification request message to an SMF.

703. The SMF obtains a PCC rule of the UE in a 5G network and a PCC rule of the UE in a 4G network using a PDU-CAN session modification procedure.

Optionally, the PCC rules include a QCI of the UE in the 5G network, a QCI of the UE in the 4G network, and at least one of the following: uplink and downlink packet filters (UL+DL Packet filters), a GBR, an MBR, or an ARP. Optionally, the UE may use same uplink and downlink packet filters (UL+DL Packet filters), GBR, MBR, and ARP parameters in the 5G network and the 4G network.

Optionally, the SMF sends a PDU-CAN session modification request message to a PCF. The PDU-CAN session establishment request message includes the service requirement of the UE. The PCF generates the PCC rule of the UE in the 5G network and the PCC rule of the UE in the 4G network based on the service requirement of the UE. The SMF receives a PDU-CAN session establishment response message sent by the PCF. The PDU-CAN session establishment response message includes the PCC rule of the UE in the 5G network and the PCC rule of the UE in the 4G network.

Optionally, the PCF may further receive a service notification message sent by an application function (AF) device. The service notification message includes the service requirement of the UE. In this case, the PCF sends a PDU-CAN session modification request message to the SMF. The PDU-CAN session modification request message includes the PCC rule of the UE in the 5G network and the PCC rule of the UE in the 4G network.

704. The SMF sends a dedicated bearer identifier assignment request message to the AMF.

705. The AMF allocates a bearer identifier to a dedicated bearer in a PDN connection corresponding to an APN.

706. The AMF sends a dedicated bearer identifier assignment response message to the SMF, where the dedicated bearer identifier assignment response message includes the bearer identifier that is of the dedicated bearer and that is allocated by the AMF.

707. The SMF allocates a flow identifier to a dedicated flow in a PDU session corresponding to a DNN.

In this embodiment, sequences of step 703, step 704 to step 706, and step 707 may be exchanged. This is not limited herein.

708. The SMF sends a PDU session modification accept message to the AMF, where the PDU session modification accept message includes the flow identifier that is of the dedicated flow in the PDU session corresponding to the DNN and that is allocated by the SMF.

Optionally, the SMF generates a QoS rule of the UE in the 5G network and a QoS rule of the UE in the 4G network according to the PCC rule of the UE in the 5G network and the PCC rule of the UE in the 4G network.

Optionally, the PDU session modification accept message may further include session management information. The session management information includes an authorized QoS rule of the dedicated flow in the PDU session and an authorized QoS rule of the dedicated bearer in the PDN connection. Optionally, the authorized QoS rule of the dedicated flow in the PDU session includes the flow identifier of the dedicated flow, and the authorized QoS rule of the dedicated bearer in the PDN connection includes the bearer identifier of the dedicated bearer.

Optionally, the dedicated flow is a GBR flow, and the dedicated bearer is a GBR bearer. The authorized QoS rule of the dedicated flow includes an uplink packet filter (UL Packet filter) of the GBR flow, and the authorized QoS rule of the dedicated bearer includes a traffic flow template (TFT) of the GBR bearer. Optionally, content included in the uplink packet filter is the same as content included in the uplink traffic flow template herein.

709. The AMF sends a PDU session modification accept message to the UE, where the session modification accept message includes the flow identifier that is of the dedicated flow and that is allocated by the SMF and the bearer identifier that is of the dedicated bearer and that is allocated by the AMF.

Optionally, the session modification accept message may further include the authorized QoS rule of the dedicated flow in the PDU session and the authorized QoS rule of the dedicated bearer in the PDN connection.

Optionally, a session establishment accept message includes the session management information included in the PDU session modification accept message in step 708.

710. The AMF receives a session modification acknowledgement (ACK) message sent by the UE.

711. The AMF sends the session modification acknowledgement message to the SMF.

712. The SMF sends a session establishment request message to a UPF.

This step is similar to step 606, and details are not described herein again.

713. The SMF receives a session establishment response message sent by the UPF, where the response message includes a tunnel ID of the UPF and a tunnel ID of a PGW-U.

This step is similar to step 607, and details are not described herein again.

In this embodiment, in a process in which the UE initiates establishment of the dedicated flow in the PDU session, the AMF allocates the corresponding dedicated bearer in the 4G network to the dedicated flow in the session, thereby avoiding a case in which a correspondence between the dedicated flow in the PDU session in the 5G network and the dedicated bearer in the PDN connection in the 4G network is established using a mapping method. According to the method in this embodiment, interworking of the UE in different networks is simpler. For example, when the UE is handed over from the 5G network to the 4G network, a procedure is simpler.

Figure 8:
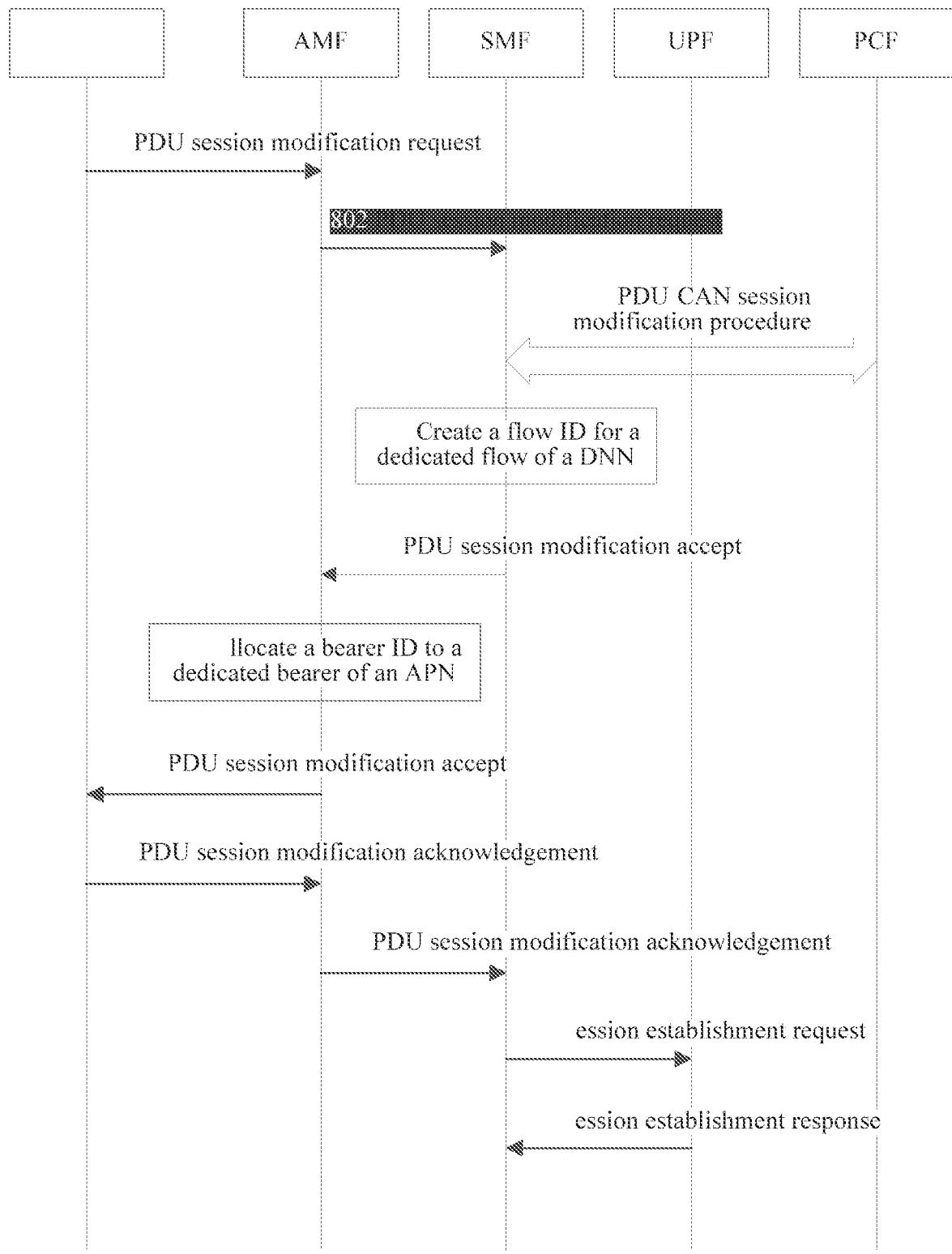
FIG. 8 is a further schematic flowchart of a session management method according to an embodiment of this disclosure.

FIG. 8 is a further schematic flowchart of a session management method according to an embodiment of this disclosure. In this embodiment, for content similar to that in the embodiments of FIG. 2 to FIG. 7, refer to descriptions corresponding to the embodiments of FIG. 2 to FIG. 7, and details are not described herein again. FIG. 8 shows another procedure in which UE initiates establishment of a dedicated flow in a PDU session. A session management method in this embodiment includes the following steps.

Step 801 to step 803 in this embodiment are similar to step 701 to step 703, and details are not described herein again.

804. The SMF allocates a flow identifier to a dedicated flow in a PDU session corresponding to a DNN.

805. The SMF sends a PDU session modification accept message to the AMF, where the PDU session modification accept message includes the flow identifier that is of the dedicated flow in the PDU session corresponding to the DNN and that is allocated by the SMF.

Optionally, the SMF generates a QoS rule of the UE in the 5G network and a QoS rule of the UE in the 4G network according to the PCC rule of the UE in the 5G network and the PCC rule of the UE in the 4G network.

Optionally, the PDU session modification accept message may further include session management information. The session management information includes an authorized QoS rule of the dedicated flow in the PDU session and an authorized QoS rule of a dedicated bearer in a PDN connection. Optionally, the authorized QoS rule of the dedicated flow in the PDU session includes the flow identifier of the dedicated flow.

Optionally, the dedicated flow is a GBR flow, and the dedicated bearer is a GBR bearer. The authorized QoS rule of the dedicated flow includes an uplink packet filter (UL Packet filter) of the GBR flow, and the authorized QoS rule of the dedicated bearer includes a traffic flow template (TFT) of the GBR bearer. Optionally, content included in the uplink packet filter is the same as content included in the uplink traffic flow template herein.

806. The AMF allocates a bearer identifier to a dedicated bearer in a PDN connection corresponding to an APN.

807. The AMF sends a PDU session modification accept message to the UE, where the PDU session modification accept message includes the flow identifier that is of the dedicated flow and that is allocated by the SMF and the bearer identifier that is of the dedicated bearer and that is allocated by the AMF.

Optionally, the session modification accept message may further include the authorized QoS rule of the dedicated flow in the PDU session and the authorized QoS rule of the dedicated bearer in the PDN connection.

Optionally, a session establishment accept message includes the bearer identifier that is of the dedicated bearer and that is allocated by the AMF and the session management information included in the PDU session modification accept message in step 805.

Step 808 to step 811 in this embodiment are similar to step 710 to step 713, and a difference lies in that the PDU session modification acknowledgement message in step 809 includes the bearer identifier that is of the dedicated bearer and that is allocated by the AMF.

In this embodiment, in a process in which the UE initiates establishment of the dedicated flow in the PDU session, the SMF first allocates the flow identifier to the dedicated flow in the PDU session corresponding to the DNN, and then sends the identifier of the dedicated flow to the AMF, such that the dedicated bearer identifier assignment request message and the dedicated bearer identifier assignment response message in FIG. 7 are omitted. Therefore, the procedure is simpler.

In the dedicated flow establishment processes in the embodiments of FIG. 7 and FIG. 8, the SMF allocates the flow identifier to the dedicated flow. This disclosure may further provide an alternative solution: The SMF aggregates, according to the PCC rule of the UE in the 5G network, a service data flow corresponding to the PCC rule of the UE in the 5G network to a dedicated flow established for the UE, and the SMF uses a flow identifier of the dedicated flow established for the UE as an identifier of a to-be-established dedicated flow. Optionally, the SMF may determine, based on a QCI and an ARP in the PCC rule, whether to aggregate the service data flow corresponding to the PCC rule to the dedicated flow established for the UE. For example, the service data flow may be aggregated to an established dedicated flow whose QCI and ARP are the same as those of the service data flow. Optionally, the alternative solution may be applied to a case in which a quantity of dedicated flows in a PDU session in the 5G network is greater than a quantity of dedicated bearers in a PDN connection in the 4G network, to avoid a problem that a one-to-one correspondence cannot be established between the dedicated flows and the dedicated bearers. Certainly, if a one-to-one correspondence can be established between dedicated flows and dedicated bearers, the alternative solution may also be used. This is not limited herein.

In the dedicated flow establishment processes in the embodiments of FIG. 7 and FIG. 8, the AMF allocates the bearer identifier to the dedicated bearer. This disclosure may further provide an alternative solution: The SMF aggregates, according to the PCC rule of the UE in the 4G network, a service data flow corresponding to the PCC rule of the UE in the 4G network to a dedicated bearer established for the UE, and the SMF uses a bearer identifier of the dedicated bearer established for the UE as an identifier of a dedicated bearer corresponding to the service data flow. Optionally, the SMF may determine, based on a QCI and an ARP in the PCC rule, whether to aggregate the service data flow corresponding to the PCC rule to the dedicated bearer established for the UE. For example, the service data flow may be aggregated to an established dedicated bearer whose QCI and ARP are the same as those of the service data flow.

FIG. 7 and FIG. 8 show procedures in which the UE initiates establishment of the dedicated flow in the PDU session. An embodiment of this disclosure further provides a procedure in which a network side initiates establishment of a dedicated flow in a PDU session. For example, a session management method in this embodiment includes the following.

A PCF receives a service requirement of a UE that is sent by an application function network element. The service requirement includes at least one of IP filtering information, a media bandwidth requirement used for QoS control, or an application bandwidth requirement used for QoS control. Optionally, the service requirement may include a service continuity requirement.

The PCF generates a PCC rule of the UE in a 5G network and a PCC rule of the UE in a 4G network based on the service requirement of the UE. Optionally, the PCC rules include a QCI of the UE in the 5G network, a QCI of the UE in the 4G network, and at least one of the following: uplink and downlink packet filters, a GBR, an MBR, or an ARP.

The PCF sends a PDU-CAN session modification request message to an SMF. The PDU-CAN session modification request message includes the PCC rule of the UE in the 5G network and the PCC rule of the UE in the 4G network.

The following steps in this embodiment are similar to step 704 to step 713 or step 804 to step 811, and details are not described herein again.

Figure 9:
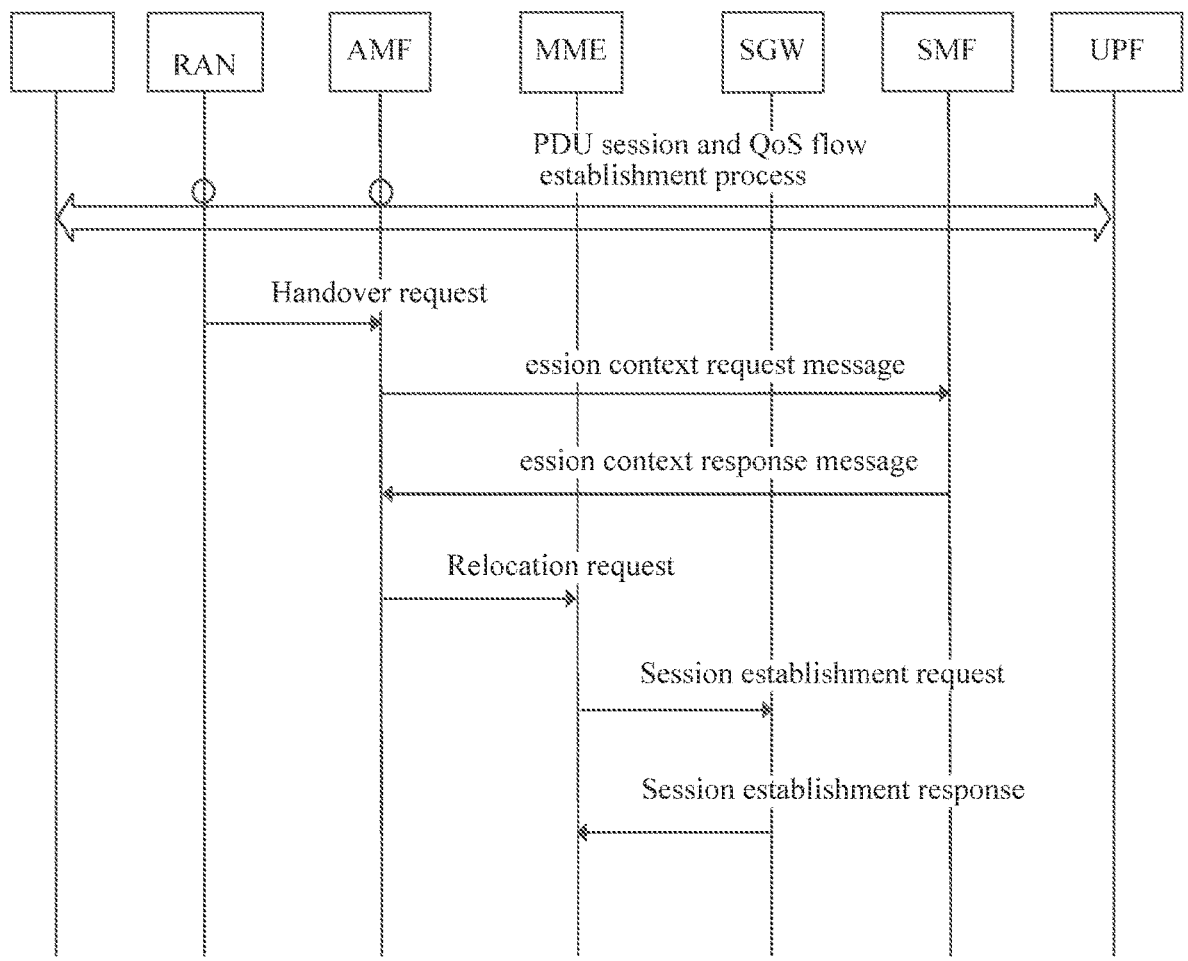
FIG. 9 is a schematic flowchart of a method for handing over a user equipment (UE) between communications networks according to an embodiment of this disclosure.

This disclosure further provides a method for handing over a UE between communications networks. FIG. 9 is a schematic flowchart of a method for handing over a UE between communications networks according to an embodiment of this disclosure. The method includes the following steps.

901. UE completes a PDU session and flow establishment process in a 5G network.

For the process, refer to the session management method and the policy and charging control method that are described above in this disclosure, and details are not described herein.

902. When the UE needs to be handed over from the 5G network to a 4G network, an access network device in the 5G network sends a handover request to an AMF.

903. The AMF sends a session context request message to an SMF.

904. The AMF receives a session context response message sent by the SMF, where the session context response message includes a bearer identifier and a PCC rule of a default bearer in a PDN connection, and/or a bearer identifier and a PCC rule of a dedicated bearer in a PDN connection.

905. The AMF sends a relocation request to an MME, where the relocation request includes indication information, and the indication information is used to instruct the MME to reselect an SGW.

Optionally, in the relocation request, address information of the SGW may be set to 0.0.0.0, to instruct the MME to reselect the SGW.

906. The MME sends a session establishment request message to the selected SGW.

907. The MME receives a session establishment response message sent by the SGW.

In this embodiment, to ensure handover from the 5G network to the 4G network, before the handover, the 5G network side reserves session management resources for the 4G network; and during the handover, the 5G network sends the session management resources to the 4G network, and the 4G network can rapidly set up a service based on the session management resources, thereby ensuring service continuity and simplifying a handover procedure.

Figure 10:
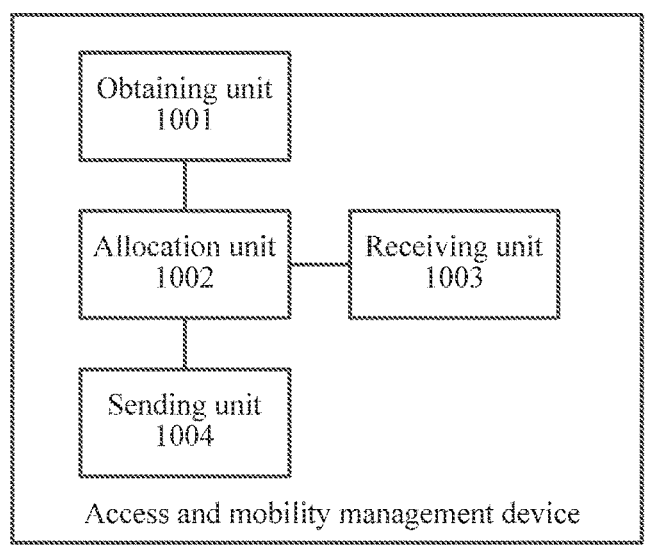
FIG. 10 is a schematic block diagram of an access and mobility management device according to an embodiment of this disclosure.

FIG. 10 is a schematic block diagram of an access and mobility management device according to an embodiment of this disclosure. The access and mobility management device includes an obtaining unit 1001, an allocation unit 1002, a receiving unit 1003, and a sending unit 1004. Optionally, the obtaining unit 1001 and the allocation unit 1002 may be processors of the access and mobility management device, and the receiving unit 1003 and the sending unit 1004 may be communications interfaces of the access and mobility management device that are configured to receive and transmit information. For the receiving unit 1003 and the sending unit 1004, refer to communications interfaces of the access and mobility management network element in the communications architecture shown in FIG. 1.

The obtaining unit 1001 is configured to obtain subscription data of a terminal in a first communications network and subscription data of the terminal in a second communications network. The subscription data of the terminal in the first communications network includes a DNN, and the subscription data of the terminal in the second communications network includes an APN corresponding to the DNN.

Optionally, the subscription data of the terminal in the first communications network further includes a subscription context corresponding to the DNN, the subscription data of the terminal in the second communications network further includes a PDN subscription context corresponding to the APN, and a PDU session establishment request message sent by the sending unit to a session management network element further includes the subscription context corresponding to the DNN and the PDN subscription context corresponding to the APN.

The allocation unit 1002 is configured to allocate a bearer identifier to a bearer in a PDN connection corresponding to the APN.

The receiving unit 1003 is configured to receive a flow identifier that is of a flow in a PDU session corresponding to the DNN and that is sent by the session management network element.

The sending unit 1004 is configured to send the bearer identifier and the flow identifier to the terminal.

The receiving unit 1003 is further configured such that before the allocation unit 1002 allocates the bearer identifier to the bearer in the PDN connection corresponding to the APN, the receiving unit 1003 receives a registration request message or a PDU session establishment request message sent by the terminal. The sending unit 1004 is further configured such that after the receiving unit 1003 receives the registration request message or the PDU session establishment request message, the sending unit 1004 sends the PDU session establishment request message to the session management network element. The bearer in the PDN connection corresponding to the APN is a default bearer, the flow in the PDU session corresponding to the DNN is a default flow, and the PDU session establishment request message includes a bearer identifier of the default bearer.

The receiving unit 1003 is further configured to receive a dedicated bearer identifier assignment request message sent by the session management network element, and the sending unit 1004 is further configured to send a dedicated bearer identifier assignment response message to the session management network element. The bearer in the PDN connection corresponding to the APN is a dedicated bearer, the flow in the PDU session corresponding to the DNN is a dedicated flow, and the dedicated bearer identifier assignment response message includes a bearer identifier of the dedicated bearer.

The receiving unit 1003 is configured to receive session management information sent by the session management network element. The session management information includes an authorized QoS rule of the flow and an authorized QoS rule of the bearer, where the authorized QoS rule of the flow includes the flow identifier, and where the authorized QoS rule of the bearer includes the bearer identifier.

The sending unit 1004 is further configured to send a location update request message to a subscriber server, and the receiving unit 1003 is further configured to receive a location update response message sent by the subscriber server. The location update response message includes the subscription data of the terminal in the first communications network and the subscription data of the terminal in the second communications network.

The receiving unit 1003 is further configured to receive a handover request sent by an access network device, the sending unit 1004 is further configured to send a session context request message to the session management network element, and the receiving unit 1003 is further configured to receive a session context response message sent by the session management network element. The session context response message includes the bearer identifier and a policy and charging control rule of the default bearer in the PDN connection; and/or the bearer identifier and a policy and charging control rule of the dedicated bearer in the PDN connection. The sending unit 1004 is further configured to send a location request to a mobility management entity. The location request includes indication information, and the indication information is used to instruct the mobility management entity to reselect a serving gateway.

The obtaining unit 1001 and the allocation unit 1002 in this embodiment are further configured to implement a data and signal processing-related function of the access and mobility management device in the embodiments of FIG. 2 to FIG. 9. The receiving unit 1003 and the sending unit 1004 are further configured to implement an information receiving and transmitting-related function of the access and mobility management network element in the embodiments of FIG. 2 to FIG. 9.

Figure 11:
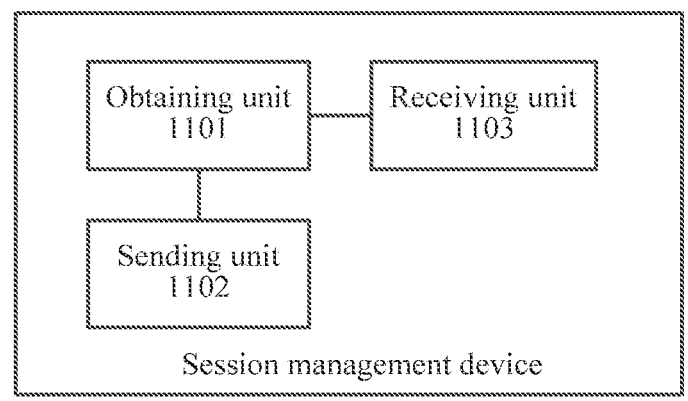
FIG. 11 is a schematic block diagram of a session management device according to an embodiment of this disclosure.

FIG. 11 is a schematic block diagram of a session management device according to an embodiment of this disclosure. The session management device includes an obtaining unit 1101, a sending unit 1102, and a receiving unit 1103. Optionally, the obtaining unit 1101 may be a processor of the session management device, and the sending unit 1102 and the receiving unit 1103 may be communications interfaces of the session management device that are configured to receive and transmit information. For the sending unit 1102 and the receiving unit 1103, refer to communications interfaces of the session management network element in the communications architecture shown in FIG. 1.

The obtaining unit 1101 is configured to: obtain a flow identifier of a flow in a PDU session corresponding to a DNN of a terminal; and obtain a bearer identifier of a bearer in a PDN connection corresponding to an APN of the terminal. The DNN is a DNN in subscription data of the terminal in a first communications network, and the APN is an APN in subscription data of the terminal in a second communications network.

The sending unit 1102 is configured to send the bearer identifier and the flow identifier to an access and mobility management network element.

The receiving unit 1103 is configured to receive a PDU session establishment request message sent by the access and mobility management network element. The bearer in the PDN connection corresponding to the APN is a default bearer, the flow in the PDU session corresponding to the DNN is a default flow, and the PDU session establishment request message includes the bearer identifier.

Optionally, the subscription data of the terminal in the first communications network further includes a subscription context corresponding to the DNN, the subscription data of the terminal in the second communications network further includes a PDN subscription context corresponding to the APN, and the PDU session establishment request message further includes the subscription context corresponding to the DNN and the PDN subscription context corresponding to the APN.

Optionally, the sending unit 1102 is further configured to send a PDU-CAN session establishment request message to a policy and charging network element. The PDU-CAN session establishment request message includes the subscription context corresponding to the DNN and the PDN subscription context corresponding to the APN. The receiving unit 1103 is further configured to receive a PDU-CAN session establishment response message sent by the policy and charging network element. The PDU-CAN session establishment response message includes a PCC rule of the terminal in the first communications network and a PCC rule of the terminal in the second communications network.

Optionally, the sending unit 1102 is further configured to send a dedicated bearer identifier assignment request message to the access and mobility management network element, and the receiving unit 1103 is configured to receive a dedicated bearer identifier assignment response message sent by the access and mobility management network element. The bearer in the PDN connection corresponding to the APN is a dedicated bearer, the flow in the PDU session corresponding to the DNN is a dedicated flow, and the dedicated bearer identifier assignment response message includes a bearer identifier of the dedicated bearer.

Optionally, the receiving unit 1103 is further configured to receive a PDU-CAN session modification request message sent by a policy and charging network element. The PDU-CAN session modification request message includes a PCC rule of the terminal in the first communications network and a PCC rule of the terminal in the second communications network.

Optionally, the sending unit 1103 is configured to send session management information to the access and mobility management network element. The session management information includes an authorized QoS rule of the flow and an authorized QoS rule of the bearer, the authorized QoS rule of the flow includes the flow identifier, and the authorized QoS rule of the bearer includes the bearer identifier.

Optionally, the obtaining unit 1101 is configured to aggregate, according to the PCC rule of the terminal in the first communications network, a service data flow corresponding to the PCC rule of the terminal in the first communications network to a dedicated flow established for the terminal. A flow identifier that is of the dedicated flow and that is obtained by the session management network element is a flow identifier of the dedicated flow established for the terminal.

Optionally, the obtaining unit 1101 is configured to aggregate, according to the PCC rule of the terminal in the second communications network, a service data flow corresponding to the PCC rule of the terminal in the second communications network to a dedicated bearer established for the terminal. The bearer identifier that is of the dedicated bearer and that is obtained by the session management network element is a bearer identifier of the dedicated bearer established for the terminal.

The obtaining unit 1101 in this embodiment is further configured to implement a data and signal processing-related function of the session management network element in the embodiments of FIG. 2 to FIG. 9. The sending unit 1102 and the receiving unit 1103 are further configured to implement an information receiving and transmitting-related function of the session management network element in the embodiments of FIG. 2 to FIG. 9.

Figure 12:
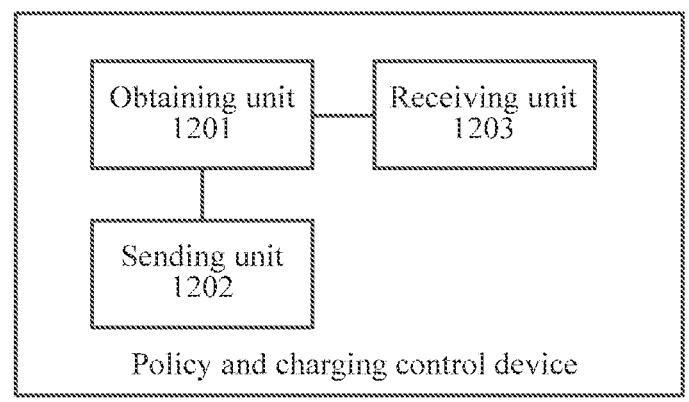
FIG. 12 is a schematic structural diagram of a policy and charging control device according to an embodiment of this disclosure.

FIG. 12 is a schematic structural diagram of a policy and charging control device according to an embodiment of this disclosure. The policy and charging control device includes an obtaining unit 1201, a sending unit 1202, and a receiving unit 1203. Optionally, the obtaining unit 1201 may be a processor of the policy and charging control device, and the sending unit 1202 and the receiving unit 1203 may be communications interfaces of the policy and charging control device that are configured to receive and transmit information. For the sending unit 1202 and the receiving unit 1203, refer to communications interfaces of the policy and charging network element in the communications architecture shown in FIG. 1.

The obtaining unit 1201 is configured to obtain a service requirement of a terminal.

The sending unit 1202 is configured to send a PDU-CAN session management message to a session management network element. The PDU-CAN session management message includes a PCC rule of the terminal in a first communications network and a PCC rule of the terminal in a second communications network.

The receiving unit 1203 is configured to receive a PDU-CAN session establishment request message sent by the session management network element. The PDU-CAN session establishment request message includes a subscription context corresponding to a DNN of the terminal in the first communications network and a PDN subscription context corresponding to an APN of the terminal in the second communications network.

Optionally, the PCC rule of the terminal in the first communications network and the PCC rule of the terminal in the second communications network include: a quality of service class identifier of the terminal in the first communications network, an authorized Session-AMBR of a default flow in a PDU session corresponding to the DNN, a quality of service class identifier of the terminal in the second communications network, and an authorized APN-AMBR of a default bearer in a PDN connection corresponding to the APN.

Optionally, the receiving unit 1203 is configured to receive the service requirement sent by the terminal or an application function network element. The service requirement includes at least one of IP filtering information, a media bandwidth requirement used for QoS control, and an application bandwidth requirement used for QoS control.

Optionally, the PCC rule of the terminal in the first communications network and the PCC rule of the terminal in the second communications network include: a quality of service class identifier of the terminal in the first communications network, a quality of service class identifier of the terminal in the second communications network, and at least one of the following: uplink and downlink packet filters, a guaranteed bit rate (GBR), a maximum bit rate (MBR), or an ARP. Optionally, the service requirement further includes a service continuity requirement.

The obtaining unit 1201 in this embodiment is further configured to implement a data and signal processing-related function of the policy and charging control network element in the embodiments of FIG. 2 to FIG. 9. The sending unit 1202 and the receiving unit 1203 are further configured to implement an information receiving and transmitting-related function of the policy and charging network element in the embodiments of FIG. 2 to FIG. 9.

Figure 13:
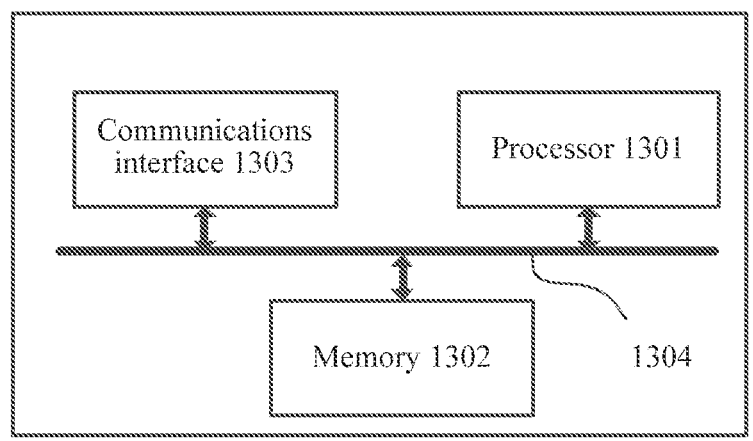
FIG. 13 is another schematic structural diagram of an access and mobility management device according to an embodiment of this disclosure.

FIG. 13 is another schematic structural diagram of an access and mobility management device according to an embodiment of this disclosure. The access and mobility management device includes a processor 1301, a memory 1302, and a communications interface 1303. The processor 1301, the memory 1302, and the communications interface 1303 may be connected to each other using a bus 1304. The bus 1304 may be a peripheral component interconnect (PCI) bus, an extended industry standard architecture (EISA) bus, or the like. The bus 404 may include an address bus, a data bus, a control bus, and the like.

Although FIG. 13 shows only one communications interface 1303, there may alternatively be a plurality of communications interfaces 1303. For example, in the communications architecture shown in FIG. 1, the communications interface may include an N2 interface, an Nx interface, an N11 interface, an N15 interface, and an N18 interface. The access and mobility management device (such as an AMF) is connected to another core network device using a corresponding interface, and receives and transmits information using a corresponding interface.

The processor 1301 may be a central processing unit (CPU), a network processor (NP), or a combination of the CPU and the NP. The processor may further include a hardware chip. The hardware chip may be an application-specific integrated circuit (ASIC), a programmable logic device (PLD), or a combination thereof. The PLD may be a complex programmable logical device (CPLD), a field-programmable gate array (FPGA), a generic array logic (GAL), or a combination thereof. Although FIG. 13 shows only one processor 1301, there may alternatively be a plurality of processors 1301 or processing units.

The memory 1302 may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), and is used as an external cache. In FIG. 13, the memory 1302 may alternatively be a storage unit in the processor 1301.

An instruction stored in the memory 1302 may make the processor 1301 perform the following operations: obtaining subscription data of a terminal in a first communications network and subscription data of the terminal in a second communications network using the communications interface 1303, where the subscription data of the terminal in the first communications network includes a DNN, and the subscription data of the terminal in the second communications network includes an APN corresponding to the DNN; allocating a bearer identifier to a bearer in a PDN connection corresponding to the APN; receiving, using the communications interface 1303, a flow identifier that is of a flow in a PDU session corresponding to the DNN and that is sent by a session management network element; and sending, using the communications interface 1303, the bearer identifier and the flow identifier to the terminal.

The processor 1301 in this embodiment is further configured to: implement a data and signal processing-related function of the access and mobility management device in the embodiments of FIG. 2 to FIG. 9; and perform a corresponding data and signal processing step. The communications interface 1303 is further configured to: implement an information receiving and transmitting-related function of the access and mobility management network element in the embodiments of FIG. 2 to FIG. 9; and perform a corresponding information receiving and transmitting step.

An embodiment of this disclosure further provides another session management device. The session management device has a structure similar to that of the access and mobility management device in FIG. 13. However, a communications interface may include an N4 interface, an N7 interface, an N11 interface, and an N10 interface in the communications architecture shown in FIG. 1. The session management device (such as an SMF) is connected to another core network device using a corresponding interface, and receives and transmits information using a corresponding interface.

Correspondingly, an instruction stored in a memory of the session management device may make the processor perform the following operations: obtaining a flow identifier of a flow in a PDU session corresponding to a DNN of a terminal, where the DNN is a DNN in subscription data of the terminal in a first communications network; obtaining a bearer identifier of a bearer in a PDN connection corresponding to an APN of the terminal, where the APN is an APN in subscription data of the terminal in a second communications network; and sending the bearer identifier and the flow identifier to an access and mobility management network element using the communications interface.

The processor in this embodiment is further configured to: implement a data and signal processing-related function of the session management network element in the embodiments of FIG. 2 to FIG. 9; and perform a corresponding data and signal processing step. The communications interface is further configured to: implement an information receiving and transmitting-related function of the session management network element in the embodiments of FIG. 2 to FIG. 9; and perform a corresponding information receiving and transmitting step.

An embodiment of this disclosure further provides another policy and charging control device. The policy and charging control device has a structure similar to that of the access and mobility management device in FIG. 13. However, a communications interface may include an N7 interface and an N15 interface in the communications architecture shown in FIG. 1. The policy and charging control device (such as a PCRF) is connected to another core network device using a corresponding interface, and receives and transmits information using a corresponding interface.

Correspondingly, an instruction stored in a memory of the policy and charging control device may make the processor perform the following operations: obtaining a service requirement of a terminal; and sending a PDU-CAN session management message to a session management network element using the communications interface, where the PDU-CAN session management message includes a PCC rule of the terminal in a first communications network and a PCC rule of the terminal in a second communications network.

The processor in this embodiment is further configured to: implement a data and signal processing-related function of the policy and charging control device in the embodiments of FIG. 2 to FIG. 9; and perform a corresponding data and signal processing step. The communications interface is further configured to: implement an information receiving and transmitting-related function of the policy and charging control device in the embodiments of FIG. 2 to FIG. 9; and perform a corresponding information receiving and transmitting step.

An embodiment of the present disclosure further provides a computer storage medium or a computer program product configured to store an instruction that can be executed by a processor and that is stored in the foregoing memory.

All or some of the foregoing embodiments may be implemented using software, hardware, firmware, or any combination thereof. When the embodiments are implemented using the software, all or some of the embodiments may be implemented in a form of a computer program product. The computer program product may include one or more computer instructions. When the computer program instruction is loaded and executed on a computer, all or some of the procedures or functions according to the embodiments of this disclosure are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device such as a server or a data center that integrates one or more usable media. The usable medium may be a magnetic medium (such as a soft disk, a hard disk, or a magnetic disk), an optical medium (such as a DVD), a semiconductor medium (such as a solid-state disk (SSD)), or the like.

A person of ordinary skill in the art may be aware that, in combination with the examples described in the embodiments disclosed in this specification, units and algorithm steps may be implemented using electronic hardware or a combination of computer software and the electronic hardware. Whether the functions are performed using hardware or software depends on particular applications and design constraint conditions of the technical solutions. A person skilled in the art may use different methods to implement the described functions for each particular application, but it should not be considered that the implementation goes beyond the scope of this disclosure.

It may be understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes any medium that can store program code, such as a Universal Serial Bus (USB) drive, a removable hard disk, a read-only memory, a random-access memory, a magnetic disk, or an optical disc.

The foregoing descriptions are merely example implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

The invention claimed is:

1. An apparatus comprising:
   a memory configured to store instructions; and
   at least one processor coupled to the memory and configured to execute the instructions to cause the apparatus to:
     receive a bearer identifier assignment request message from a session management network element in a first communication network during a procedure for establishing a flow in a protocol data unit (PDU) session in the first communication network;
     allocate a bearer identifier to a dedicated bearer in a second communication network, wherein the dedicated bearer in the second communication network corresponds to the flow in the first communication network; and
     send a bearer identifier assignment response message to the session management network element,
     wherein the bearer identifier assignment response message comprises the bearer identifier.

2. The apparatus according to claim 1, wherein the at least one processor is further configured to execute the instructions to cause the apparatus to:
   receive a handover request from an access network device in the first communication network, wherein the handover request requests to hand over a terminal from the first communication network to the second communication network;
   send a session context request message to the session management network element in response to the handover request; and
   receive a session context response message from the session management network element, wherein the session context response message comprises the bearer identifier.

3. The apparatus according to claim 2, wherein the at least one processor is further configured to execute the instructions to cause the apparatus to send a relocation request to a mobility management entity in the second communication network, and wherein the relocation request comprises indication information instructing the mobility management entity to select a serving gateway in the second communication network.

4. The apparatus according to claim 3, wherein the indication information comprises address information of the serving gateway in the second communication network.

5. The apparatus according to claim 1, wherein the at least one processor is further configured to execute the instructions to cause the apparatus to receive a registration request message from a terminal, and wherein the registration request message comprises indication information indicating that the terminal is capable of performing communication in the first communication network and in the second communication network.

6. The apparatus according to claim 1, wherein the procedure for establishing the flow in the PDU session in the first communication network comprises a terminal-initiated procedure or a network side-initiated procedure.

7. The apparatus according to claim 1, wherein the at least one processor is further configured to execute the instructions to cause the apparatus to:
   before receiving the bearer identifier assignment request message, receive a PDU session modification request message from a terminal and send the PDU session modification request message to the session management network element; and
   after sending the bearer identifier assignment response message to the session management network element, receive a PDU session modification accept message from the session management network element, wherein the PDU session modification accept message comprises the bearer identifier and a flow identifier of the dedicated-flow.

8. The apparatus according to claim 7, wherein the PDU session modification accept message further comprises first quality of service (QoS) parameters corresponding to the dedicated-flow and second QoS parameters corresponding to the dedicated bearer.

9. The apparatus according to claim 7, wherein the at least one processor is further configured to execute the instructions to cause the apparatus to send the PDU session modification accept message to the terminal.

10. The apparatus according to claim 7, wherein the bearer identifier of the dedicated bearer corresponds to the flow identifier of the dedicated-flow.

11. The apparatus according to claim 1, wherein the flow is an aggregate of a plurality of flows.

12. The apparatus according to claim 1, wherein the dedicated bearer is in a packet data network (PDN) connection corresponding to an access point name (APN) in the second communication network.

13. The apparatus according to claim 1, wherein the first communication network is a fifth generation (5G) communication network, and wherein the second communication network is a 4.5G or 4G communication network.

14. The apparatus according to claim 1, wherein the apparatus is an access and mobility management network element.

15. A communication method comprising:
   receiving, by an access and mobility management network element in a first communication network, a bearer identifier assignment request message from a session management network element in the first communication network during a procedure for establishing a dedicated flow in a protocol data unit (PDU) session in the first communication network;
   allocating, by the access and mobility management network element, a bearer identifier to a dedicated bearer in a second communication network, wherein the dedicated bearer in the second communication network corresponds to the flow in the first communication network; and sending, by the access and mobility management network element, a bearer identifier assignment response message to the session management network element, wherein the bearer identifier assignment response message comprises the bearer identifier.

16. The communication method according to claim 15, further comprising:

receiving, by the access and mobility management network element, a handover request from an access network device in the first communication network, wherein the handover request requests to hand over a terminal from the first communication network to the second communication network;

sending, by the access and mobility management network element in response to the handover request, a session context request message to the session management network element; and receiving, by the access and mobility management network element, a session context response message from the session management network element, wherein the session context response message comprises the bearer identifier.

17. The communication method according to claim 15, further comprising receiving, by the access and mobility management network element, a registration request message from a terminal, wherein the registration request message comprises indication information indicating that the terminal is capable of performing communication in the first communication network and in the second communication network.

18. The communication method according to claim 15, wherein before receiving the bearer identifier assignment request message by the access and mobility management network element, the communication method further comprises:

receiving, by the access and mobility management network element, a PDU session modification request message from a terminal;

sending, by the access and mobility management network element, a PDU session modification request message to the session management network element, and wherein after sending the bearer identifier assignment response message to the session management network element the communication method further comprises:

receiving, by the access and mobility management network element, a PDU session modification accept message from the session management network element, wherein the PDU session modification accept message comprises the bearer identifier and a flow identifier of the flow; and sending, by the access and mobility management network element, the PDU session modification accept message to the terminal.

19. The communication method according to claim 18, wherein the PDU session modification accept message further comprises first quality of service (QoS) parameters corresponding to the flow and second QoS parameters corresponding to the dedicated bearer.

20. A non-transitory computer readable storage medium comprising computer readable instruction, which when executed by a processor of an apparatus, cause the apparatus to:

receive a bearer identifier assignment request message from a session management network element in a first communication network during a procedure for establishing a flow in a protocol data unit (PDU) session in the first communication network;

allocate a bearer identifier to a dedicated bearer in a second communication network, wherein the dedicated bearer in the second communication network corresponds to the flow in the first communication network; and send a bearer identifier assignment response message to the session management network element, wherein the bearer identifier assignment response message comprises the bearer identifier.

* * * * *

UNITED STATES PATENT AND TRADEMARK OFFICE
CERTIFICATE OF CORRECTION

PATENT NO. : 11,622,395 B2
APPLICATION NO. : 17/226398
DATED : April 4, 2023
INVENTOR(S) : Yang Xin et al.

Page 1 of 1

It is certified that error appears in the above-identified patent and that said Letters Patent is hereby corrected as shown below:

In the Claims

Claim 7, Column 32, Line 31: "the dedicated-flow." should read "the flow."

Claim 8, Column 32, Line 35: "dedicated-flow and" should read "flow and"

Claim 10, Column 32, Line 43: "the dedicated-flow." should read "the flow."

Claim 15, Column 32, Line 63: "a dedicated-flow" should read "a flow"

Signed and Sealed this
Twenty-third Day of May, 2023

Katherine Kelly Vidal
*Director of the United States Patent and Trademark Office*